United States Patent
Sato et al.

(10) Patent No.: US 8,410,984 B2
(45) Date of Patent: Apr. 2, 2013

(54) ELECTRONIC APPARATUS

(75) Inventors: Yutaka Sato, Kawasaki (JP); Goki Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 12/379,685

(22) Filed: Feb. 26, 2009

(65) Prior Publication Data

US 2009/0322627 A1    Dec. 31, 2009

(30) Foreign Application Priority Data

Jun. 27, 2008  (JP) ................. 2008-168990

(51) Int. Cl.
*H01Q 1/24* (2006.01)
*H01Q 3/02* (2006.01)
*H04M 1/00* (2006.01)

(52) U.S. Cl. ............... 343/702; 343/882; 455/575.7
(58) Field of Classification Search ........... 343/702, 343/882; 455/575.7
See application file for complete search history.

(56) References Cited

U.S. PATENT DOCUMENTS

| | | | |
|---|---|---|---|
| 5,271,684 A * | 12/1993 | Phillips | 403/106 |
| 6,317,085 B1 * | 11/2001 | Sandhu et al. | 343/702 |
| 6,642,892 B2 | 11/2003 | Masaki et al. | |
| 6,853,336 B2 * | 2/2005 | Asano et al. | 343/702 |
| 7,050,008 B2 | 5/2006 | Saito et al. | |
| 2002/0053878 A1 | 5/2002 | Masaki et al. | |
| 2002/0187805 A1 * | 12/2002 | Song | 455/556 |
| 2004/0207558 A1 | 10/2004 | Saito et al. | |
| 2007/0063918 A1 * | 3/2007 | Leisten et al. | 343/895 |
| 2007/0273591 A1 | 11/2007 | Kim et al. | |

FOREIGN PATENT DOCUMENTS

| | | |
|---|---|---|
| EP | 1860726 A1 | 11/2007 |
| JP | 43-13954 | 6/1968 |
| JP | 9-83226 | 3/1997 |
| JP | 10-150313 | 6/1998 |
| JP | 10-209905 | 8/1998 |
| JP | 2000-174527 | 6/2000 |
| JP | 2002-151928 | 5/2002 |
| JP | 2004-228790 | 8/2004 |
| JP | 2004-328316 | 11/2004 |
| JP | 2007-318749 | 12/2007 |

OTHER PUBLICATIONS

Japanese Office Action for Application No. 2008-168990 issued May 22, 2012.

* cited by examiner

*Primary Examiner* — Jacob Y Choi
*Assistant Examiner* — Graham Smith
(74) *Attorney, Agent, or Firm* — Staas & Halsey LLP

(57) ABSTRACT

An electronic apparatus includes an antenna housing groove extending in an extension direction of one end surface of a housing; and the housing having a boss protruding in the antenna housing groove in a width direction of the antenna housing groove; and a metal plate member that is passed through the boss and is sandwiched between the housing and the antenna body to interact with the bearing member, that is locked in both locked positions of a housed position in which the antenna body is housed in the antenna housing groove and in a protruding position in which the antenna body is rotated from the housed position by a predetermined angle and protrudes from the housing so that the metal plate member holds the positions of the antenna body, and that releases the lock upon reception of a force in a rotational direction of the antenna body.

4 Claims, 40 Drawing Sheets

ELECTRONIC APPARATUS

CROSS-REFERENCE TO RELATED APPLICATION(S)

This application is based upon and claims the benefit of priority of the prior Japanese Laid-open Patent No. 2008-168990, filed on Jun. 27, 2008, the entire contents of which are incorporated herein by reference.

FIELD

The embodiment discussed herein is related to an electronic apparatus having an antenna.

BACKGROUND

A reduction in size and weight has been strongly desired for an electronic apparatus such as a laptop personal computer, a cellular phone, and the like. For the electronic apparatus, a structure has been widely used in which a display housing provided with a display screen is openably and closably connected to a main housing provided with a keyboard, push buttons and the like. Such a structure allows the user to fold the electronic apparatus in a way that the main housing and the display housing overlap each other for carriage, and also to open the display housing so as to use the keyboard and the push buttons for operation. Thereby, the portability of the electronic apparatus is improved without miniaturizing the keyboard and bush buttons.

Meanwhile, there is a strong demand for an increase in size of the display device. In response to this demand, a wide-type electronic apparatus has been marketed as a hot item, in which a display device using a thin and light liquid crystal panel is employed or in which a display screen is widened up to a portion close to a side surface of a display housing.

By the way, a laptop personal computer equipped with a radio communication function by having an antenna built-in beside a liquid crystal panel or the like has been increased. However, sensitivity is insufficient by only an antenna built in the housing depending on a place to use. Thus, an auxiliary antenna exposed outside the housing may be needed.

In this regard, a technique has been known in which an antenna capable of being locked at a predetermined angle by using a cam mechanism or the like is provided in a cellular phone (for example, see Japanese Laid-open Patent Publication Nos. H10-209905, H9-83226, and H10-150313). Moreover, a technique has been known in which an antenna capable of being housed in a housing by being bent, or expanded and contracted, is provided in a personal computer (for example, see Japanese Laid-open Patent Publication Nos. 2007-318749, 2002-151928, and 2000-174527).

The electronic apparatus, which is portably used at a place where a radio wave does not easily reach and a narrow place, preferably includes an antenna which can be housed in a housing when a communication function is not used, and which can be exposed to the outside from the housing, depending on a radio wave condition.

However, in the electronic apparatus which is miniaturized and has a limited space for mounting parts, there is a problem that the techniques described above are not able to be simply employed. Particularly, in the electronic apparatus using a wide-type display device where an antenna is mounted on a display housing, a space between the display housing and a liquid crystal panel is very narrow, thus causing a problem that the techniques are not able to be employed.

SUMMARY

According to an basic aspect of the invention, an electronic apparatus includes:

a housing that houses an electronic component and has a rectangular plate shape, and that includes: an antenna housing groove being formed on one end surface of the housing and extending in an extension direction of the one end surface; and a boss protruding in the antenna housing groove in a width direction of the antenna housing groove at one end portion of the antenna housing groove;

an antenna body that includes a plate piece shape with a length to be housed in the antenna housing groove and an antenna for radio communication, and that includes in one end portion of the antenna body a bearing member having an insertion opening which passes through front and rear surfaces of the antenna body to receive insertion of the boss; and a metal plate member that is passed through the boss and is sandwiched between the housing and the antenna body to interact with the bearing member, that is locked in both locked positions of a housed position in which the antenna body is housed in the antenna housing groove and in a protruding position in which the antenna body is rotated from the housed position by a predetermined angle and protrudes from the housing so that the metal plate member holds the positions of the antenna body, and that releases the lock upon reception of a force in a rotational direction of the antenna body.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

A specific embodiment for the basic aspect described above will be explained with reference to the drawings.

Figure 1:
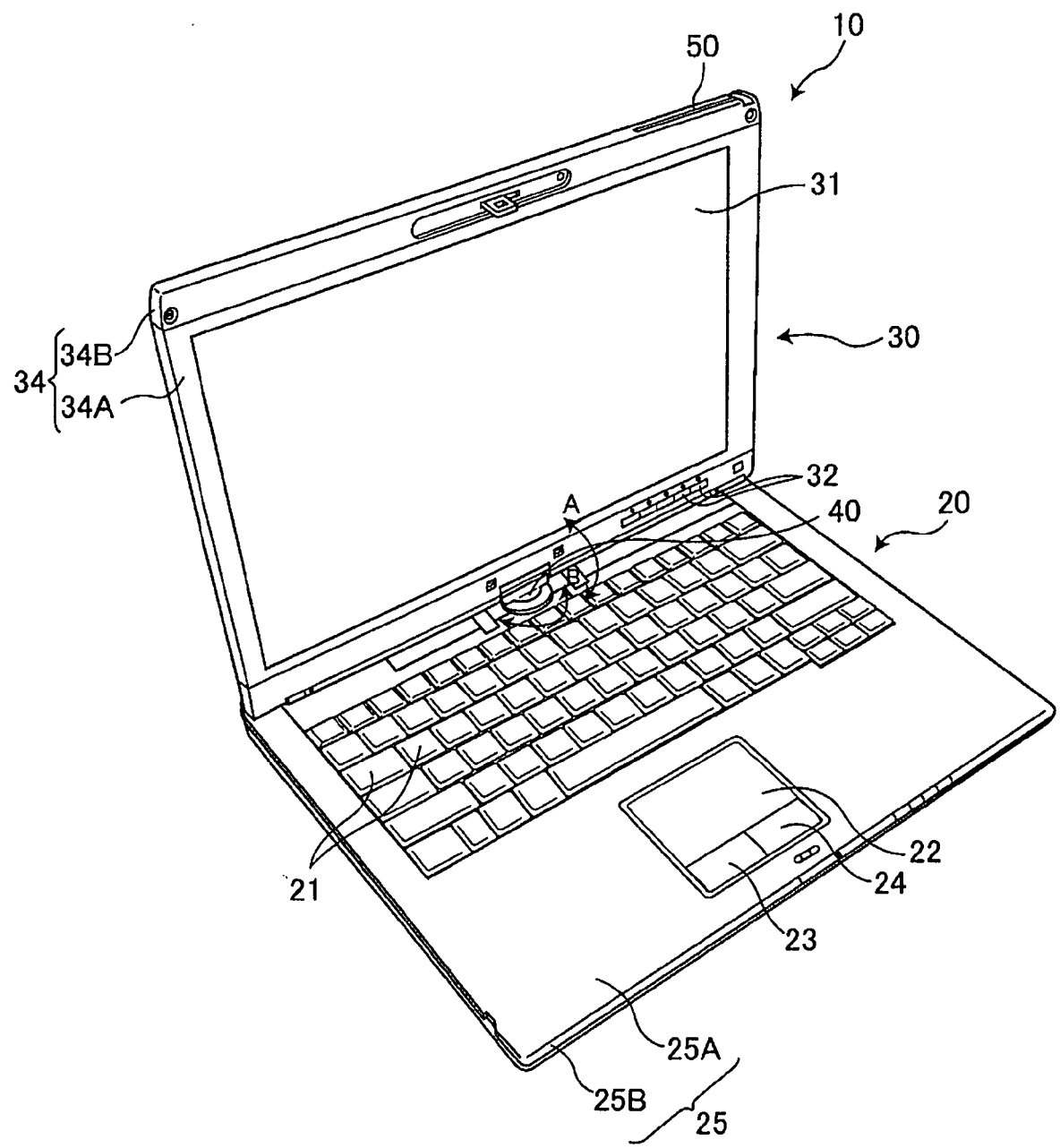
FIG. 1 is an external view of a personal computer as a specific first embodiment of an electronic apparatus.

FIG. 1 is an external view of a personal computer 10 being a specific first embodiment of the electronic apparatus.

The personal computer 10 includes a main unit 20 and a display unit 30. These main unit 20 and display unit 30 are connected to each other through a biaxial connecting section 40 in such a way that the display unit 30 is openable and closable with respect to the main unit 20 in a direction of an arrow A (hereinafter referred to as the direction A) and rotatable (around a rotary shaft arranged perpendicular to the main unit 20) in a direction of an arrow B (hereinafter referred to as the direction B). The connecting section 40 corresponds to one example of the connecting section of the electronic apparatus. FIG. 1 illustrates the personal computer 10 with the display unit 30 opened to the main unit 20 (opened state).

The main unit 20 has a main housing 25 which houses therein electronic components such as a hard disk, various boards and the like, the main housing 25 including an upper cover 25A and a lower housing 25B. In addition, the main unit 20 includes a keyboard with multiple keys 21 arranged, a track pad 22, a left click button 23 and a right click button 24 on its upper surface. The main housing 25 corresponds to one example of the second housing of the electronic apparatus.

The display unit 30 of the personal computer 10 is one for displaying a result of information processing executed by the main unit 20. The display unit 30 has a display housing 34 which houses therein a thin liquid crystal panel, a control circuit for the liquid crystal panel, an electromagnetic induction-type digitizer or a touch panel, and the like, the display housing 34 including a front cover 34A and a rear cover 34B. The display housing 34 corresponds to one example of the first housing of the electronic apparatus. Moreover, the display housing 34 includes multiple push buttons 32 at a lower portion of a display screen 31. The display housing 34 also includes on its upper end surface a housed antenna 50 housable in the display housing 34.

Figure 2:
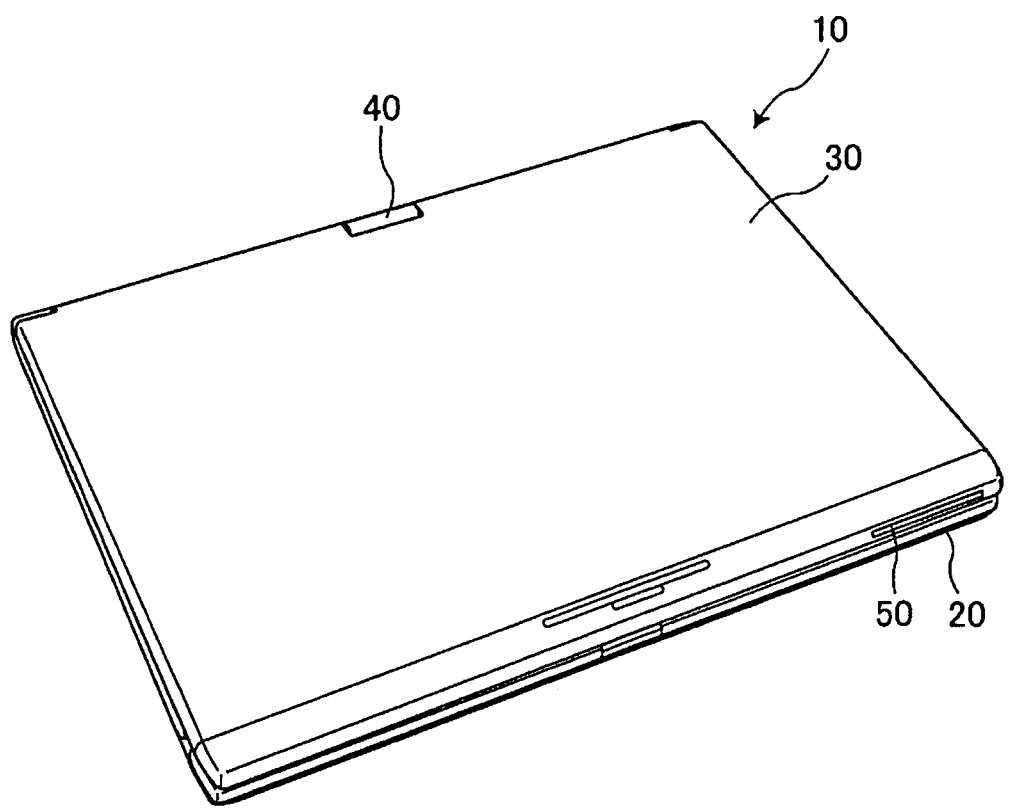
FIG. 2 is an external perspective view illustrating a front side of the personal computer with a display unit closed on a main unit.
Figure 3:
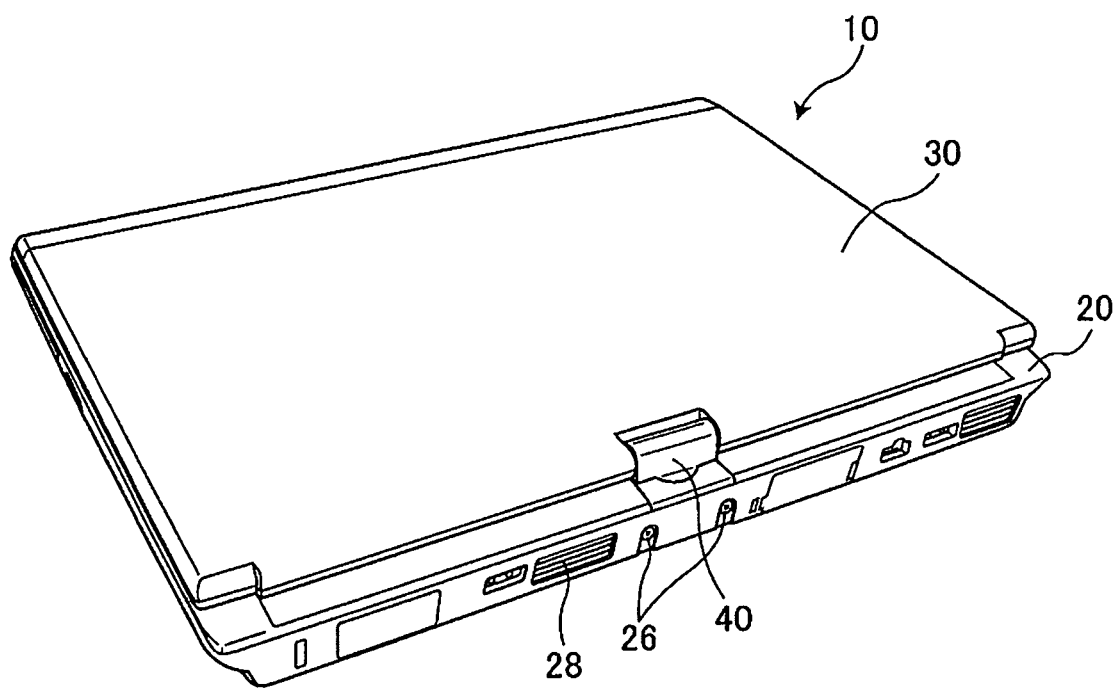
FIG. 3 is an external perspective view illustrating a rear side of the personal computer in the state illustrated in FIG. 2.

FIG. 2 is an external perspective view illustrating a front side of the personal computer 10 with the display unit 30 closed on the main unit 20. FIG. 3 is an external perspective view illustrating a rear side of the personal computer 10 in the state illustrated in FIG. 2.

In FIG. 2, the display unit 30 overlaps the main unit 20 with the display screen 31 (see FIG. 1) directed toward the main unit 20. This state is hereinafter called as a first closed state.

When the display unit 30 being in the opened state as illustrated in FIG. 1 is closed in the direction A, as illustrated in FIG. 2, the display screen 31 is hidden and a surface opposed to the display screen 31, that is, a rear side of the display housing 34 is exposed. This is the state called the first closed state. In the first closed state, the user can carry the personal computer 10 while preventing the display screen 31 from being stained and damaged.

As illustrated in FIG. 3, screws 26 are attached to the rear side of the main unit 20. The screws 26 fix the connecting section 40 to the main unit 20. The main unit 20 also includes an air inlet 28 on its rear side. The air inlet 28 takes in air to the inside of the main unit 20. The air thus taken in from the air inlet 28 absorbs heat generated by various electronic components and is exhausted from an outlet (not illustrated) provided on a side surface of the main unit 20.

Figure 4:
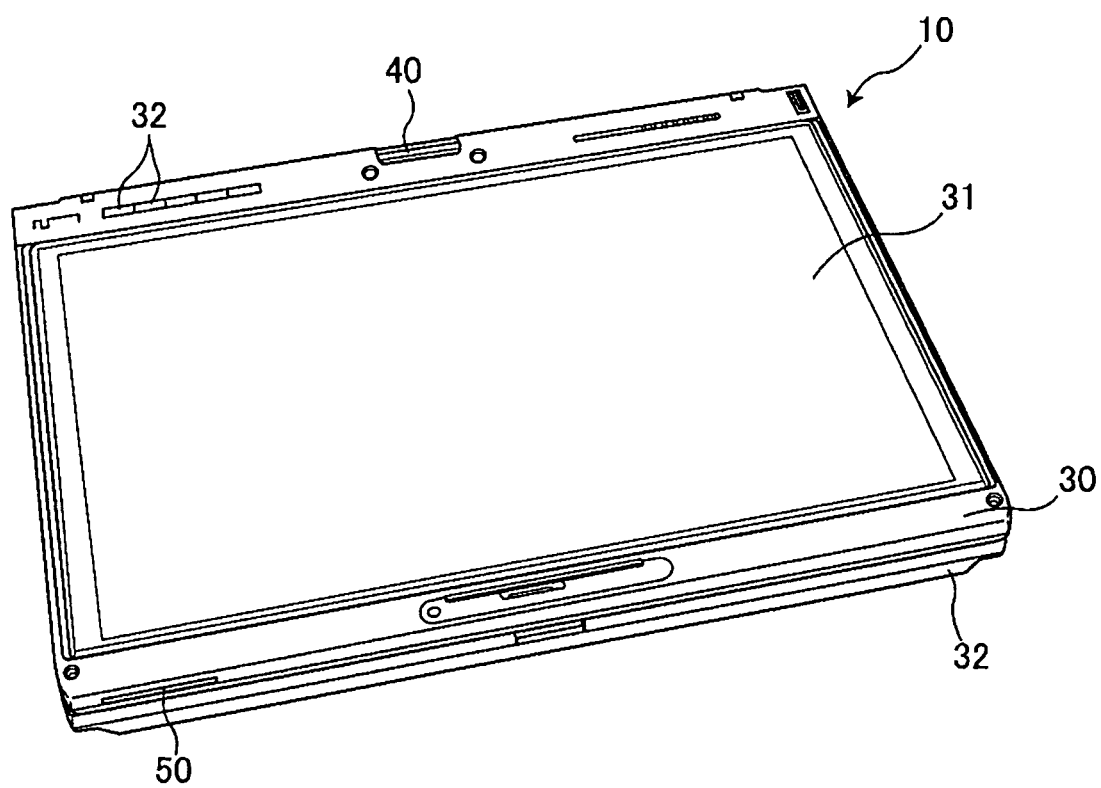
FIG. 4 is an external perspective view illustrating a state in which the display unit overlaps the main unit with a display screen directed upward.

FIG. 4 is an external perspective view illustrating a state in which the display unit 30 overlaps the main unit 20 with the display screen 31 directed upward.

The state illustrated in FIG. 4 can be obtained by rotating the display unit 30 by 180 degrees in the direction B from the state illustrated in FIG. 1 so that the display screen 31 may be directed to a side opposed to the keyboard, and then, under this state, by overlapping the display unit 30 on the main unit 20 with a surface of the display unit 30 opposed to the display screen 31 directed toward the main unit 20. This state is called a second closed state. The second closed state is a mode in which the personal computer 10 is used as a tablet PC (tablet mode).

The personal computer 10 is basically configured as mentioned above.

Sequentially, each section of the personal computer 10 will be explained in detail.

(Antenna)

First, the housed antenna 50 illustrated in FIG. 1 will be explained.

Figure 5:
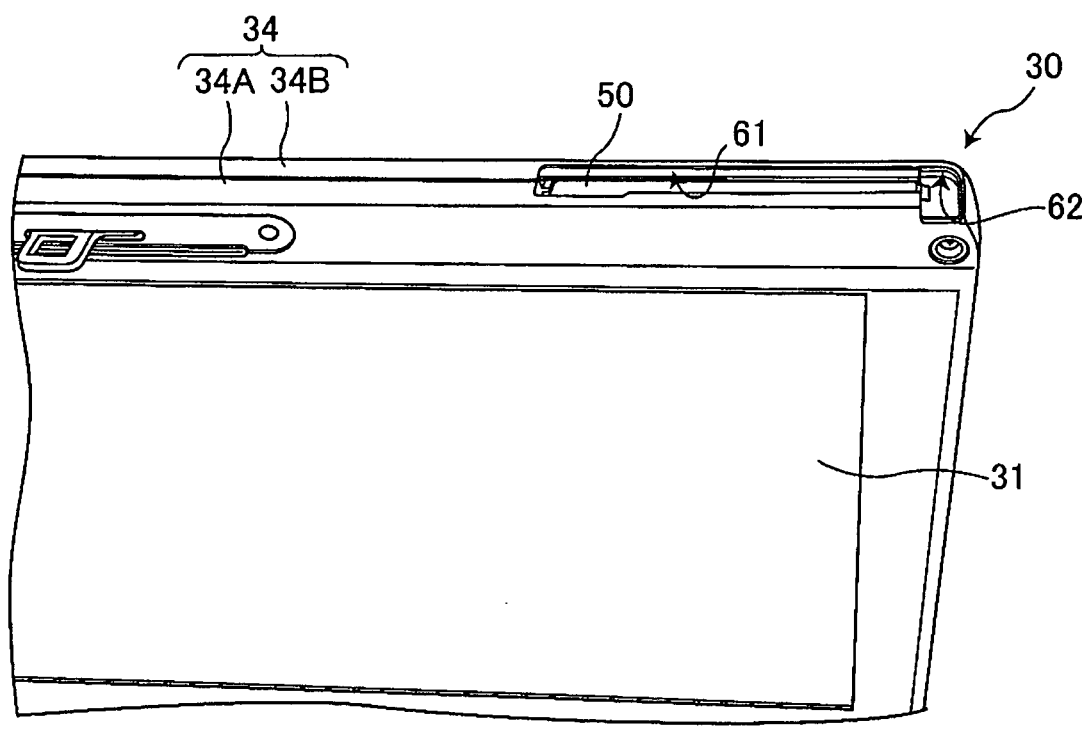
FIG. 5 is a view illustrating a state in which a housed antenna is housed in the display unit.
Figure 6:
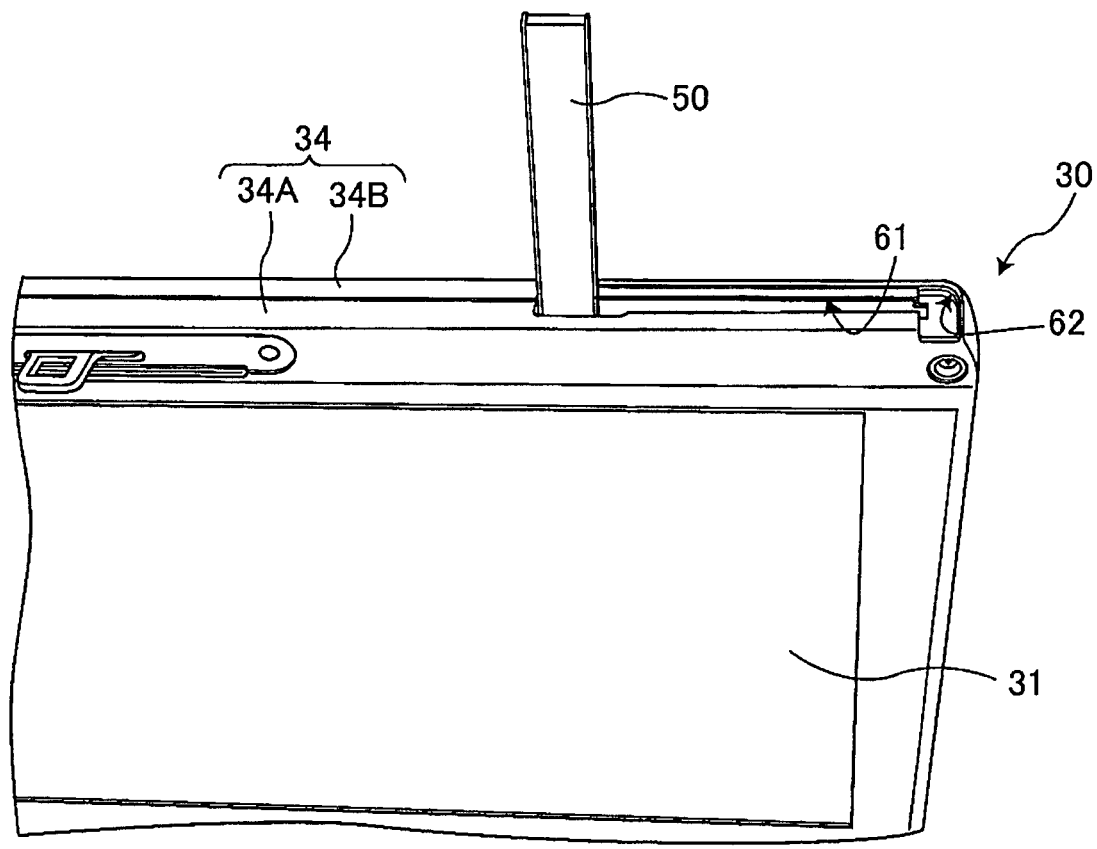
FIG. 6 is a view illustrating a state in which the housed antenna is erected on the display unit.

FIG. 5 is a view illustrating a state in which the housed antenna 50 is housed in the display unit 30. FIG. 6 is a view illustrating a state in which the housed antenna 50 is erected on the display unit 30.

The display housing 34 includes on its upper end surface an antenna housing groove 61 extending in a width direction of the display housing 34. As illustrated in FIG. 5, the housed antenna 50 is housed inside the antenna housing groove 61 (housed position).

Moreover, the antenna housing groove 61 includes a notch 62 on its end portion. The user can erect the housed antenna 50 on the display housing 34 as illustrated in FIG. 6 (protruding position) by putting his/her finger in the notch 62 to pull up the housed antenna 50.

Figure 7:
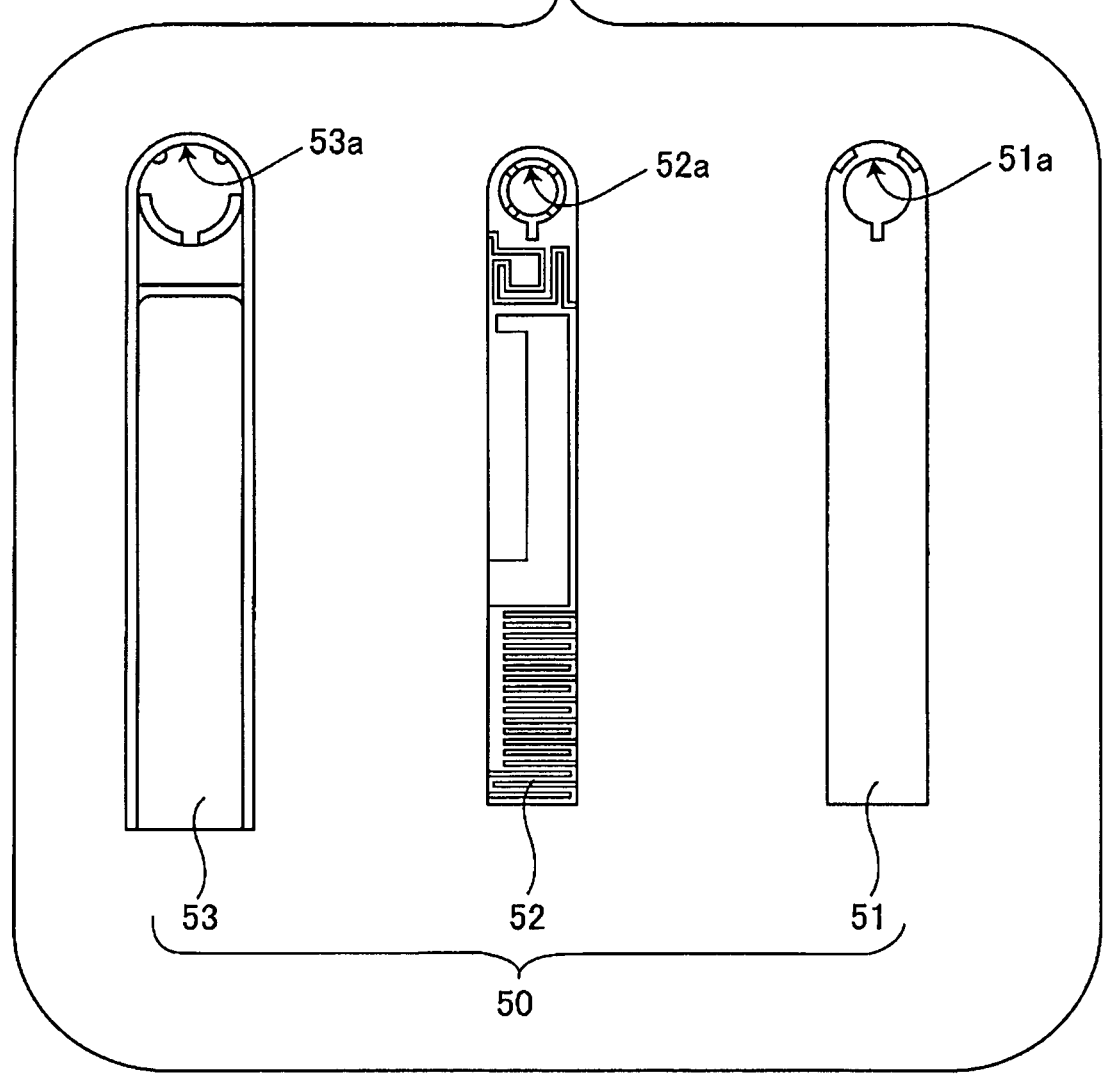
FIG. 7 is an exploded view of the housed antenna.

FIG. 7 is an exploded view of the housed antenna 50.

The housed antenna 50 includes a plate piece-like upper cover 51, an antenna 52 and a lower cover 53. The upper cover 51 has a through-hole 51a on its one end side. The antenna 52 and the lower cover 53 have through-holes 52a and 53a, respectively, at positions each corresponding to the through-hole 51a. The housed antenna 50 is assembled in such a manner that the antenna 52 is fitted into the lower cover 53 and the upper cover 51 is attached to the lower cover 53. The upper cover 51 and the lower cover 53 are formed of flexible materials such as elastomer, rubber (NBR, silicone rubber, CR), sheet (PET, PC) and the like. Further, any antenna such as a FPC antenna, a board antenna, a plate antenna or the like may be used as the antenna 52.

Figure 8:
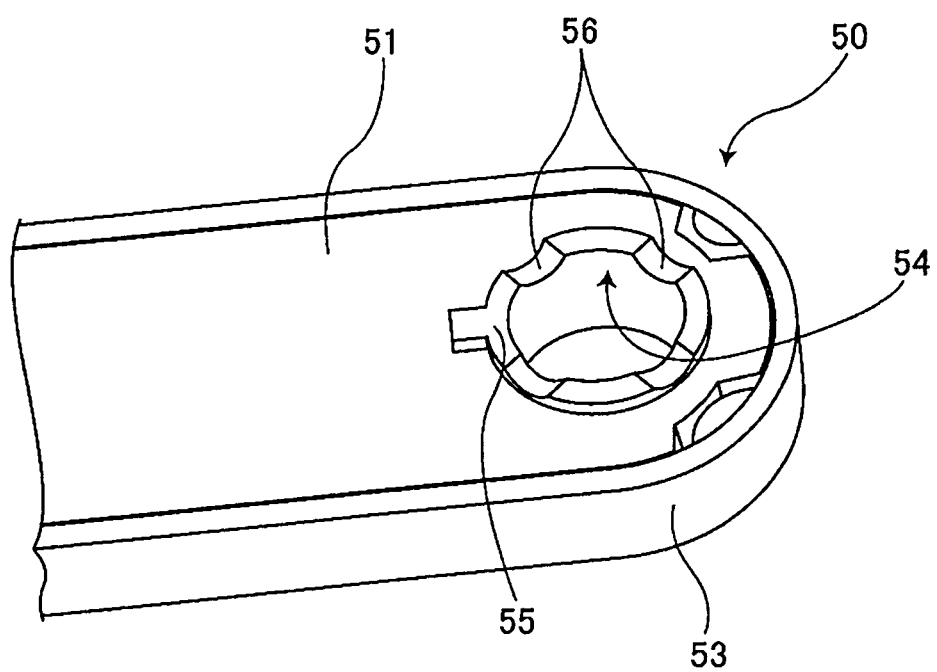
FIG. 8 is a perspective view illustrating an assembled housed antenna seen from an upper cover side.

FIG. 8 is a perspective view illustrating the assembled housed antenna 50 seen from the upper cover 51 side.

As illustrated in FIG. 8, the housed antenna 50 has an insertion opening 54. A boss 82A (see FIG. 9) provided in the display unit 30 is inserted into the insertion opening 54. A bearing portion 55 that forms an edge of the insertion opening 54 has multiple concave sections 56 that surround the insertion opening 54. The insertion opening 54 is fixed to the antenna 52 so as to be electrically conducted therewith by a predetermined fixing method such as soldering, caulking, bonding, screwing and the like.

Figure 9:
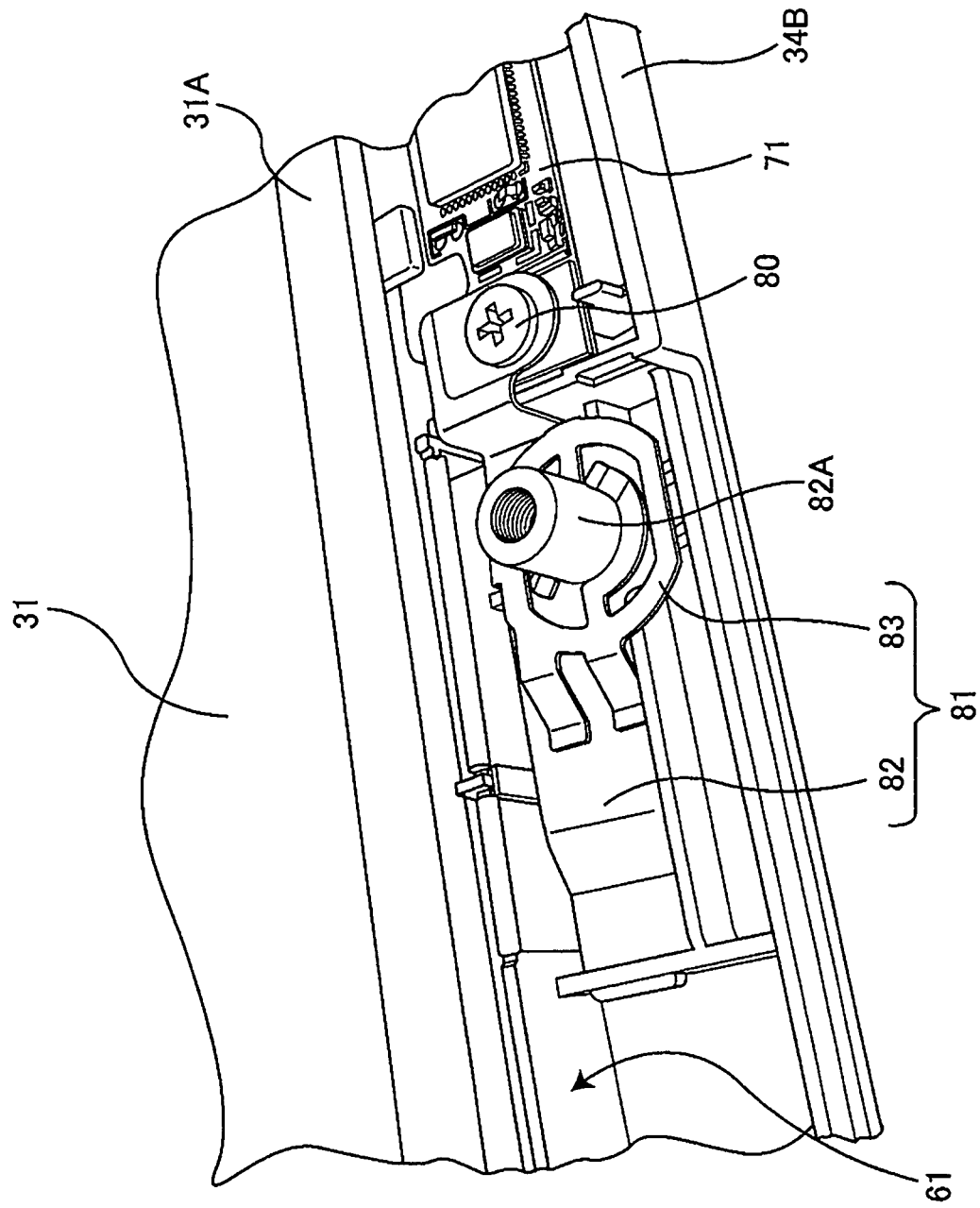
FIG. 9 is a view illustrating a rear cover of the display unit.

FIG. 9 is a view illustrating the rear cover 34B of the display unit 30.

A liquid crystal panel 31A is attached to the rear cover 34B such that the display screen 31 may face the front. The rear cover 34B houses a camera board module 71, a built-in antenna (not illustrated), a fixing bracket 81 for fixing the housed antenna 50 illustrated in FIG. 8, and the like in a free space beside the liquid crystal panel 31A. The fixing bracket 81 includes the boss 82A, a boss member 82, and a metal plate member 83. The boss 82A is inserted into the insertion opening 54 of the housed antenna 50. The boss member 82 is directly fixed to the rear cover 34B by a screw 80. The metal plate member 83 is fitted into the boss 82A to thereby be indirectly fixed to the rear cover 34B, and the bearing portion 55 of the housed antenna 50 abuts thereon.

Figure 10:
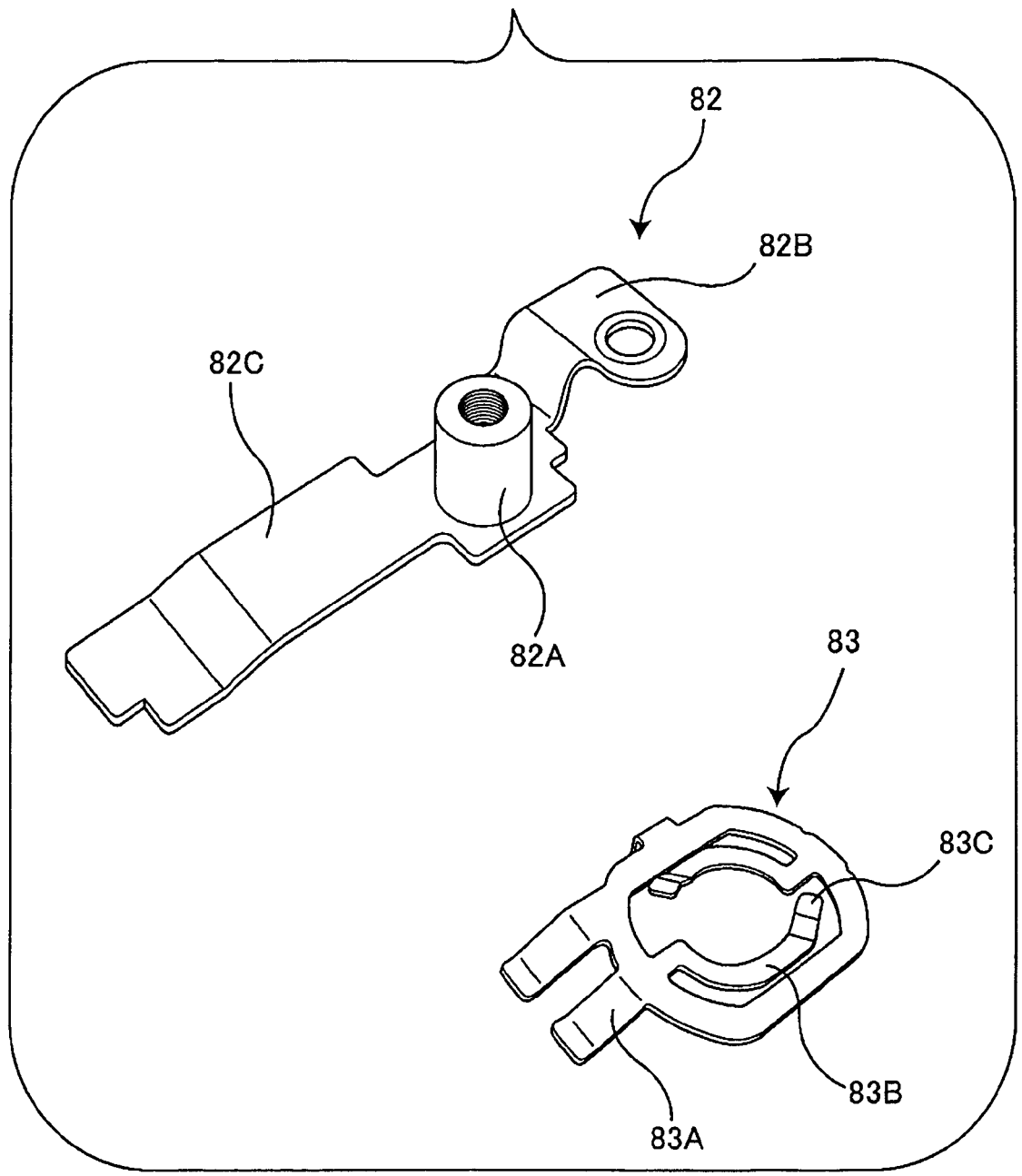
FIG. 10 is a view illustrating a boss member and a metal plate member.
Figure 11:
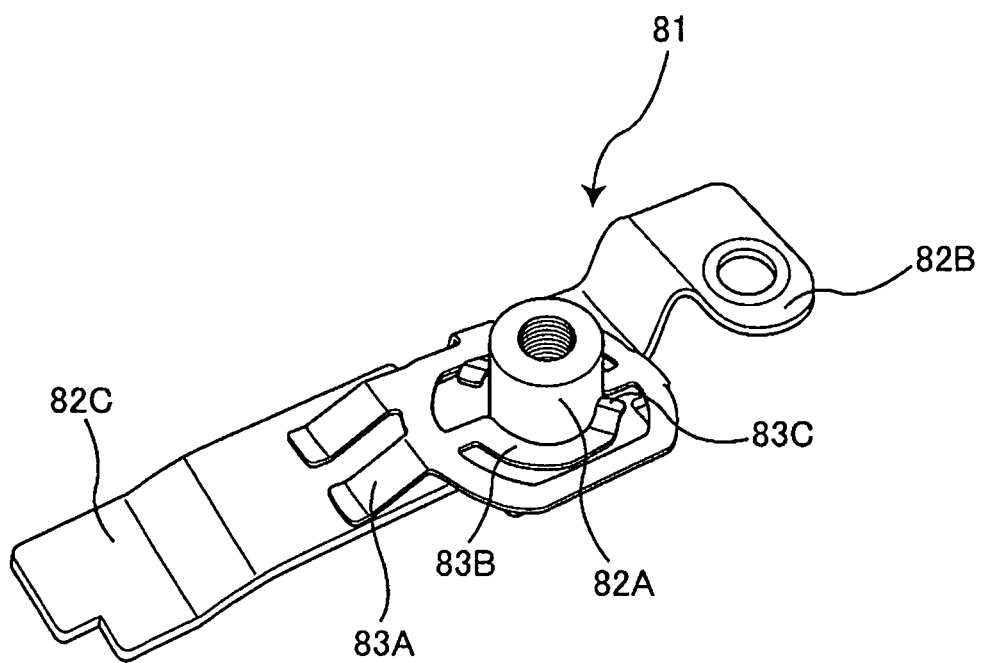
FIG. 11 is a view illustrating a fixing bracket obtained by assembling the boss member and the metal plate member.

FIG. 10 is a view illustrating the boss member 82 and the metal plate member 83. FIG. 11 is a view illustrating the fixing bracket 81 obtained by assembling the boss member 82 and the metal plate member 83.

The boss member 82 has the boss 82A, a fixing section 82B, and a leg section 82C. The boss 82A is inserted into the metal plate member 83 and the housed antenna 50. The fixing section 82B is fixed to the rear cover 34B of the display unit 30. The leg section 82C is a portion extending in a direction opposed to the fixing section 82B. The metal plate member 83 has engagement sections 83B and a ground leg piece 83A. The engagement sections 83B surround the boss 82A inserted into the metal plate member 83. Moreover, the engagement sections 83B each have a convex section 83C at its tip end. The ground leg piece 83A extends from the engagement section 83B to press-contact the leg section 82C of the boss member 82. The engagement section 83B has elasticity since it has a plate piece-like shape.

Figure 12:
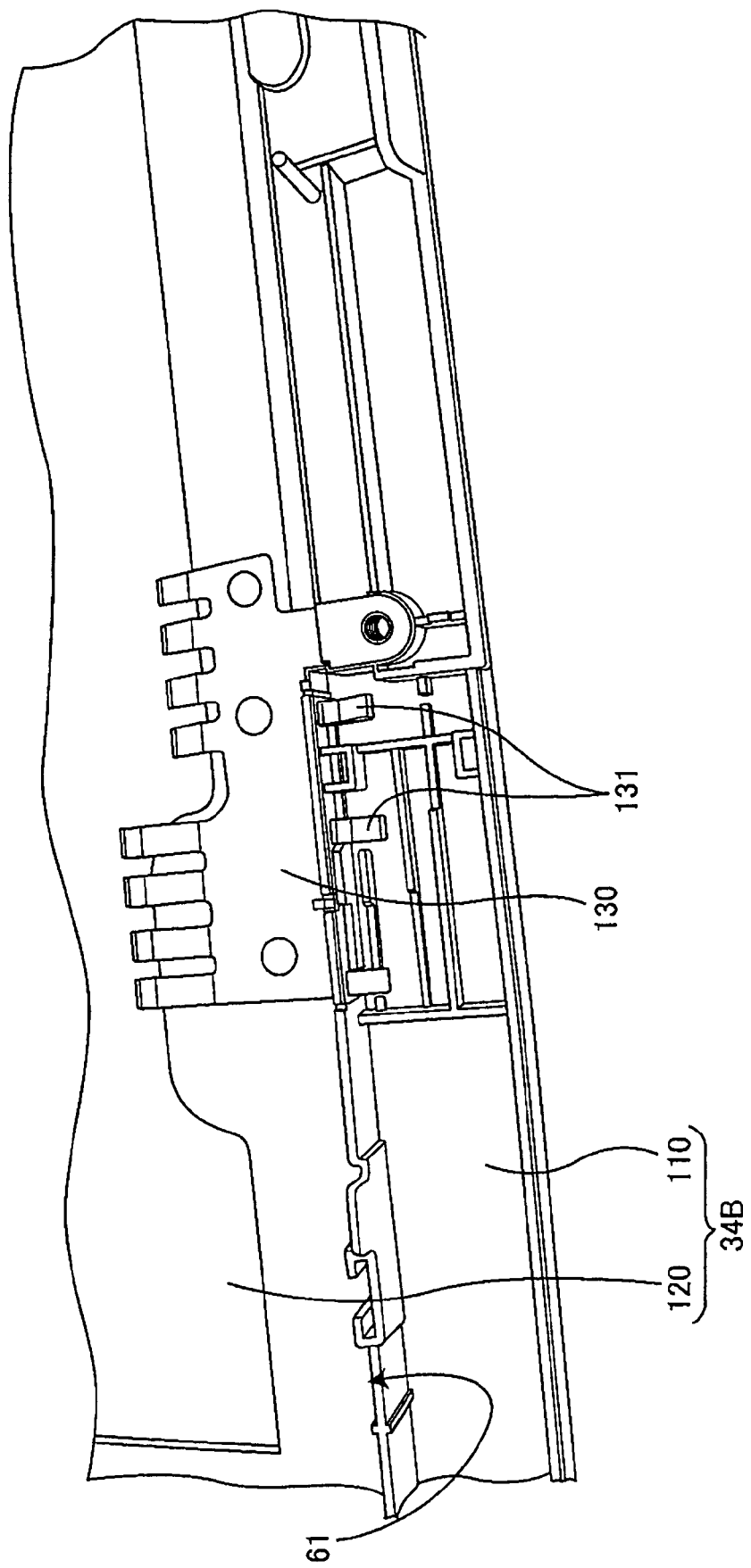
FIG. 12 is a view illustrating a state in which a liquid crystal panel, a camera board module and the fixing bracket are detached from the rear cover illustrated in FIG. 9.

FIG. 12 is a view illustrating a state in which the liquid crystal panel 31A, the camera board module 71 and the fixing bracket 81 are detached from the rear cover 34B illustrated in FIG. 9.

The rear cover 34B includes a metal part 120 and a plastic part 110. The plastic part 110 surrounds an outer periphery of the metal part 120. The camera board module 71, the built-in antenna (not illustrated) and the housed antenna 50 are arranged on the plastic part 110. The plastic part 110 allows transmission of radio waves transmitted and received to and from the built-in antenna. Moreover, a grounding part 130 made of metal is attached to the plastic part 110. The grounding part 130 extends from the metal part 120 to a position where the housed antenna 50 is installed.

The fixing bracket 81 is arranged on a rib 131 of the grounding part 130. The boss member 82 of the fixing bracket 81 and the camera board module 71 are fixed to the rear cover 34B by the screw 80 illustrated in FIG. 9. Sequentially, the boss 82A of the fixing bracket 81 is inserted into the insertion opening 54 of the housed antenna 50. In this manner, the housed antenna 50 is indirectly fixed to the rear cover 34B.

The grounding part 130 extending from the metal part 120 comes in contact with the fixing bracket 81, whereby the housed antenna 50 is indirectly connected to the metal part 120 and is grounded.

Further, the boss 82A is inserted into the insertion opening 54, whereby the convex section 83C of the metal plate member 83 (FIG. 10) is fitted into the concave section 56 (FIG. 8) of the housed antenna 50.

FIG. 13 is a view illustrating a positional relationship between the convex section 83C of the metal plate member 83 and the concave section 56 of the housed antenna 50.

Figure 13A:
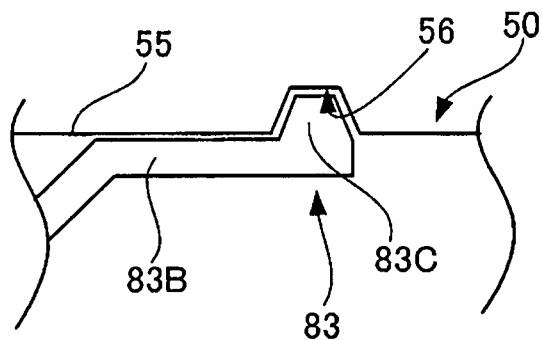
FIGS. 13A and 13B are views illustrating a positional relationship between a convex section of the metal plate member and a concave section of the housed antenna.

Under a state in which the housed antenna 50 is housed in the antenna housing groove 61 as illustrated in FIG. 5, the convex section 83C of the metal plate member 83 is fitted into the concave section 56 of the housing antenna 50 as illustrated in FIG. 13A.

Figure 13B:
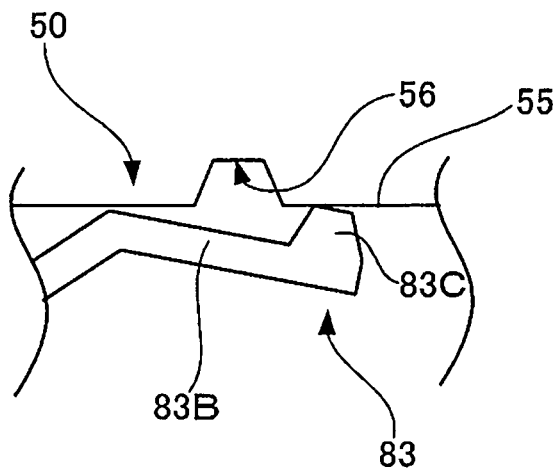

When the user puts his/her fingers in the notch 62 of the display unit 30 and pulls up the housed antenna 50, the housed antenna 50 rotates about the boss 82A, so that engagement between the convex section 83C of the metal plate member 83 and the concave section 56 of the housing antenna 50 is released. Here, as illustrated in FIG. 13B, the engagement section 83B of the metal plate member 83 is deformed by the bearing portion 55 of the housed antenna 50, so that the convex section 83C is pressed down. Thereby, the user is able to easily rotate the housed antenna 50. When the user further rotates the housed antenna 50 from the state illustrated in FIG. 13B, the convex section 83C of the metal plate member 83 is fitted into a concave section 56 of the housed antenna 50 different from the concave section 56 into which the convex section 83C has been fit during the housed antenna 50 has been fit into the antenna housing groove 61, so that the state is returned to one illustrated in FIG. 13A. As a result, the housed antenna 50, which is erected at 90 degrees to the display unit 30, is held as illustrated in FIG. 6.

Thus, according to this embodiment, the housed antenna 50, which is movable between the housed position and the protruding position, can be mounted on the electronic apparatus without requiring a large space. This makes it possible to attach both the built-in antenna and the housed antenna 50 in a narrow space beside the liquid crystal panel 31A in the display unit 30 of the electronic apparatus and to improve communication performance. Moreover, when no communication function is used, the housed antenna 50 can be housed in the display housing. Also, it is possible to use the housed antenna 50 with being erected at a place where a radio wave condition is bad.

Herein, the explanation of this embodiment is once stopped and a personal computer of a different version having a housed antenna will be explained.

First, a description will be given of the personal computer having only the housed antenna 50 as the antenna in the display unit.

When the built-in antenna is mounted beside the liquid crystal panel 31A, a portion where the built-in antenna is arranged needs to be formed by using plastic or the like that easily transmits a radio wave. However, the housed antenna 50 is erected outside the housing when being used, and therefore a portion where the housed antenna 50 is arranged may be formed of metal.

Figure 14:
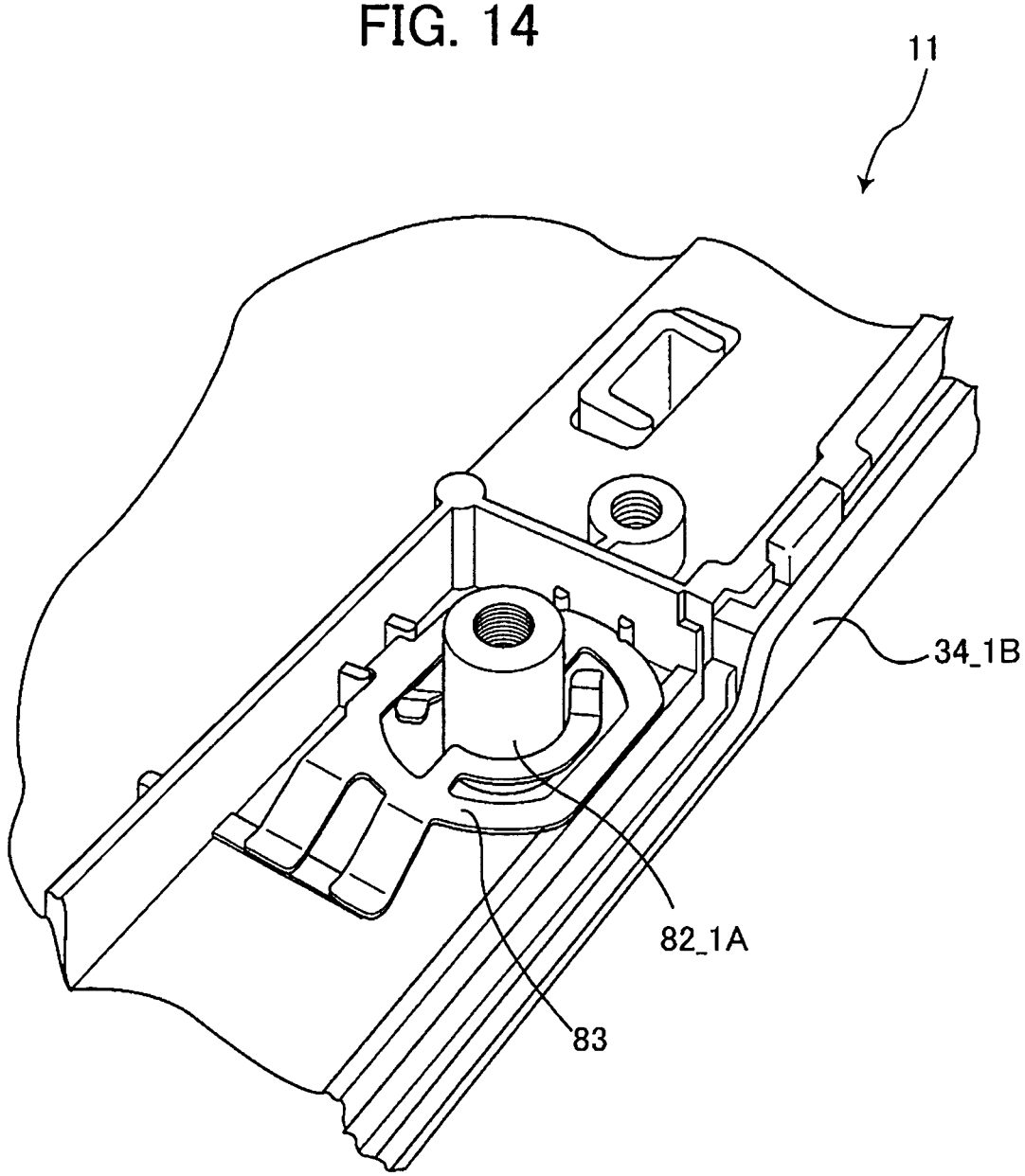
FIG. 14 is a view illustrating a rear cover of a display unit of a personal computer having only the housed antenna.

FIG. 14 is a view illustrating a rear cover 34_1B of a display unit of a personal computer 11 having only the housed antenna 50.

In the personal computer 11 of the different version illustrated in FIG. 14, the entire surface, where the liquid crystal panel 31 and the housed antenna 50 are attached, of the rear cover 34_1B is formed of metal. A boss 82_1A is formed so as to protrude from the rear cover 34_1B. Accordingly, the boss 82_1A is formed of metal, similar to the rear cover 34_1B. When the entire surface, where the housed antenna 50 is attached, of the rear cover 34_1B is formed of metal in this manner, the housed antenna 50 is grounded by inserting the boss 82_1A into the insertion opening 54 of the housed antenna 50. For this reason, the grounding part 130 (see FIG. 12) and the boss member 82 (see FIG. 9) can be omitted. However, when radio wave intensity is insufficient only from the housed antenna 50, it is preferable that a portion where the antenna is arranged be formed of plastic or the like and both the built-in antenna and the housed antenna be mounted as illustrated in FIG. 9.

Next, a description will be given of a personal computer 12 in which a rotary shaft of the housed antenna 50 is provided at a corner of a display unit 30_2.

Figure 15:
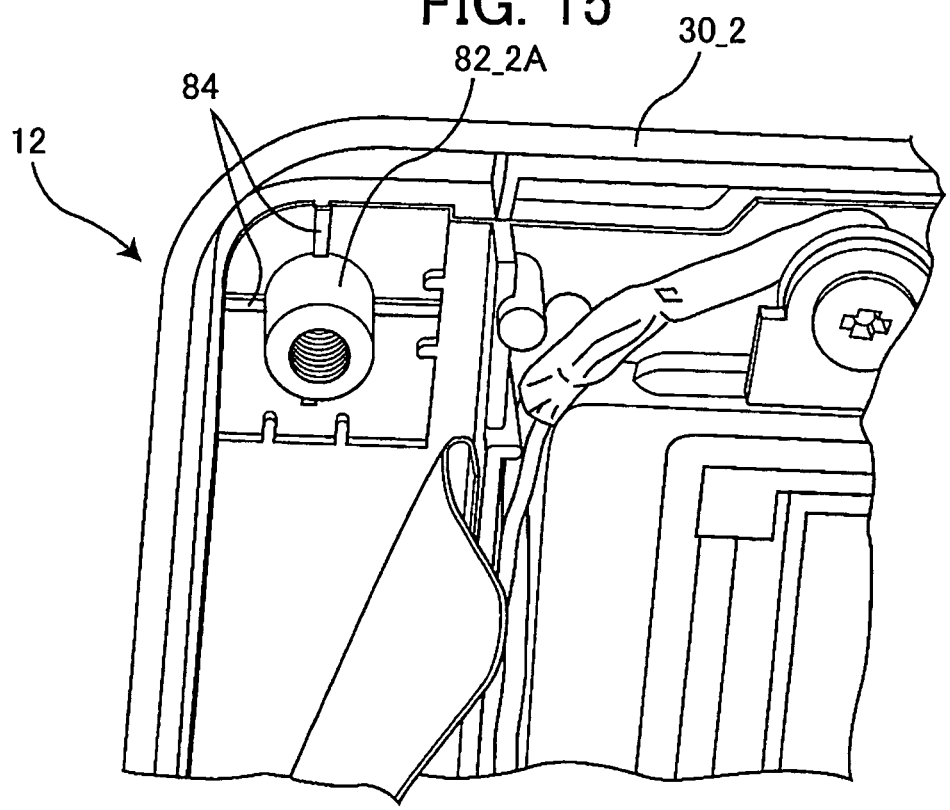
FIG. 15 is a view illustrating a rear cover of a display unit of a personal computer in which a rotary shaft of the housed antenna is provided at a corner of the display unit.

FIG. 15 is a view illustrating a rear cover of the display unit 30_2 of the personal computer 12 in which the rotary shaft of the housed antenna 50 is provided at the corner of the display unit 30_2.

In the personal computer 12 illustrated in FIG. 15, a boss 82_2A is formed at at least one (upper left side in this embodiment) of four corners of the display unit 30_2. Additionally, at the base of the boss 82_2A, four ribs 84 are formed at positions separated from one another in the display unit 30_2.

Figure 16:
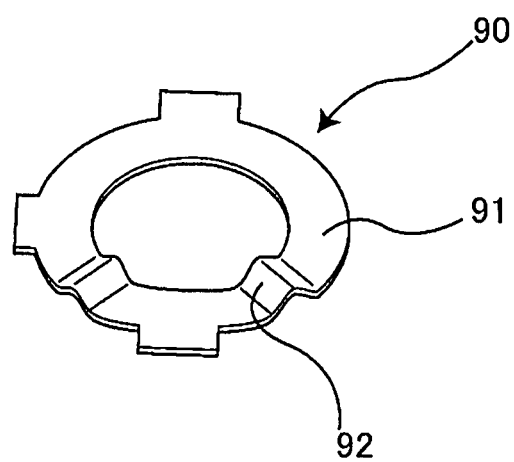
FIG. 16 is a view illustrating a metal plate member to be fitted into a boss of the personal computer illustrated in FIG. 15.

FIG. 16 is a view illustrating a metal plate member 90 to be fit into the boss 82_2A of the personal computer 12 illustrated in FIG. 15.

The metal member 90 illustrated in FIG. 16 has two convex sections 92 at positions, being separated from each other, on an upper surface of a main body 91 having a through-hole into which the boss 82_2A is to be inserted. Note that, the metal plate member 90 has no ground leg piece 83A unlike the metal plate member 83 illustrated in FIG. 10.

Figure 17:
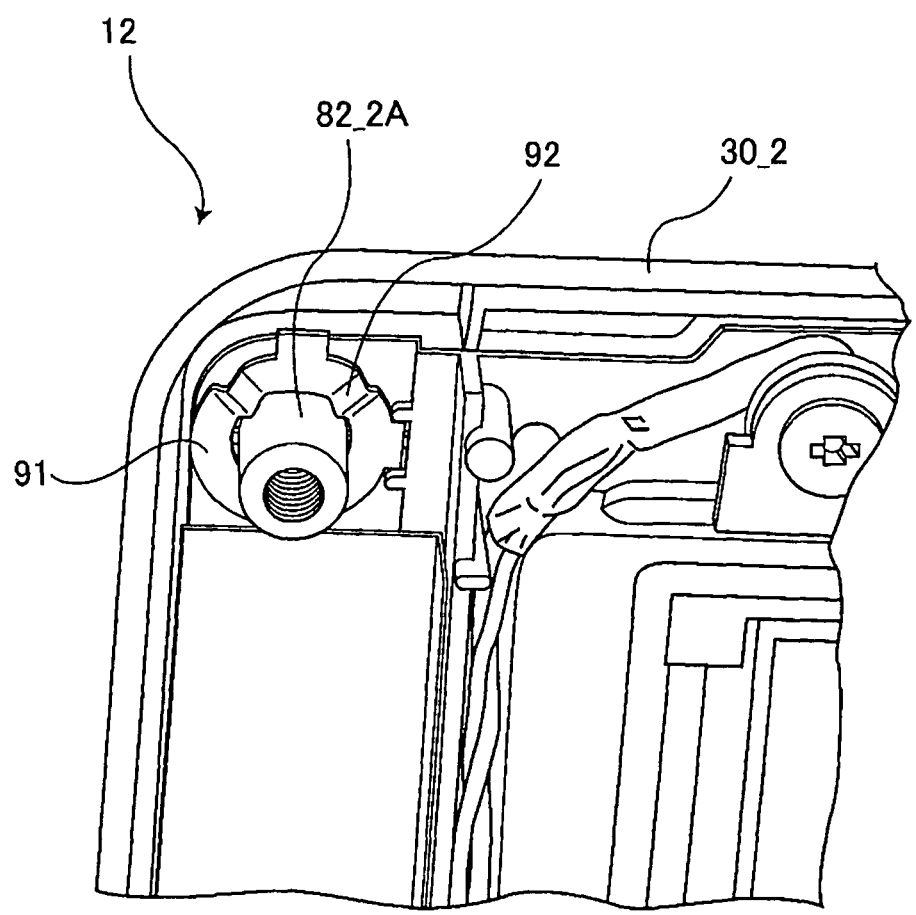
FIG. 17 is a view illustrating a state in which the metal plate member is attached to the rear cover illustrated in FIG. 15.

FIG. 17 is a view illustrating a state in which the metal plate member 90 is attached to the rear cover illustrated in FIG. 15.

The metal plate member 90 is attached to the boss 82_2A in a state where the ribs 84 and the convex sections 92 of the display unit 30_2 are shifted from each other. Further, the housed antenna 50 is attached so that the convex section 92 of the metal plate member 90 may be fit into the concave section 56 of the housed antenna 50 illustrated in FIG. 8.

Figure 18:
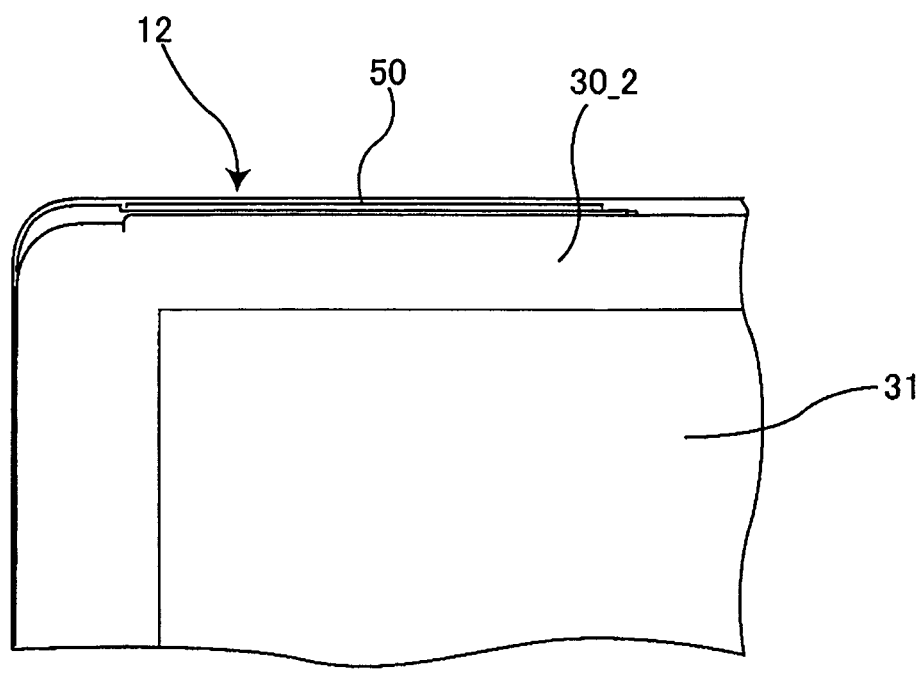
FIG. 18 is a view illustrating a state in which the housed antenna is housed in the display unit.
Figure 19:
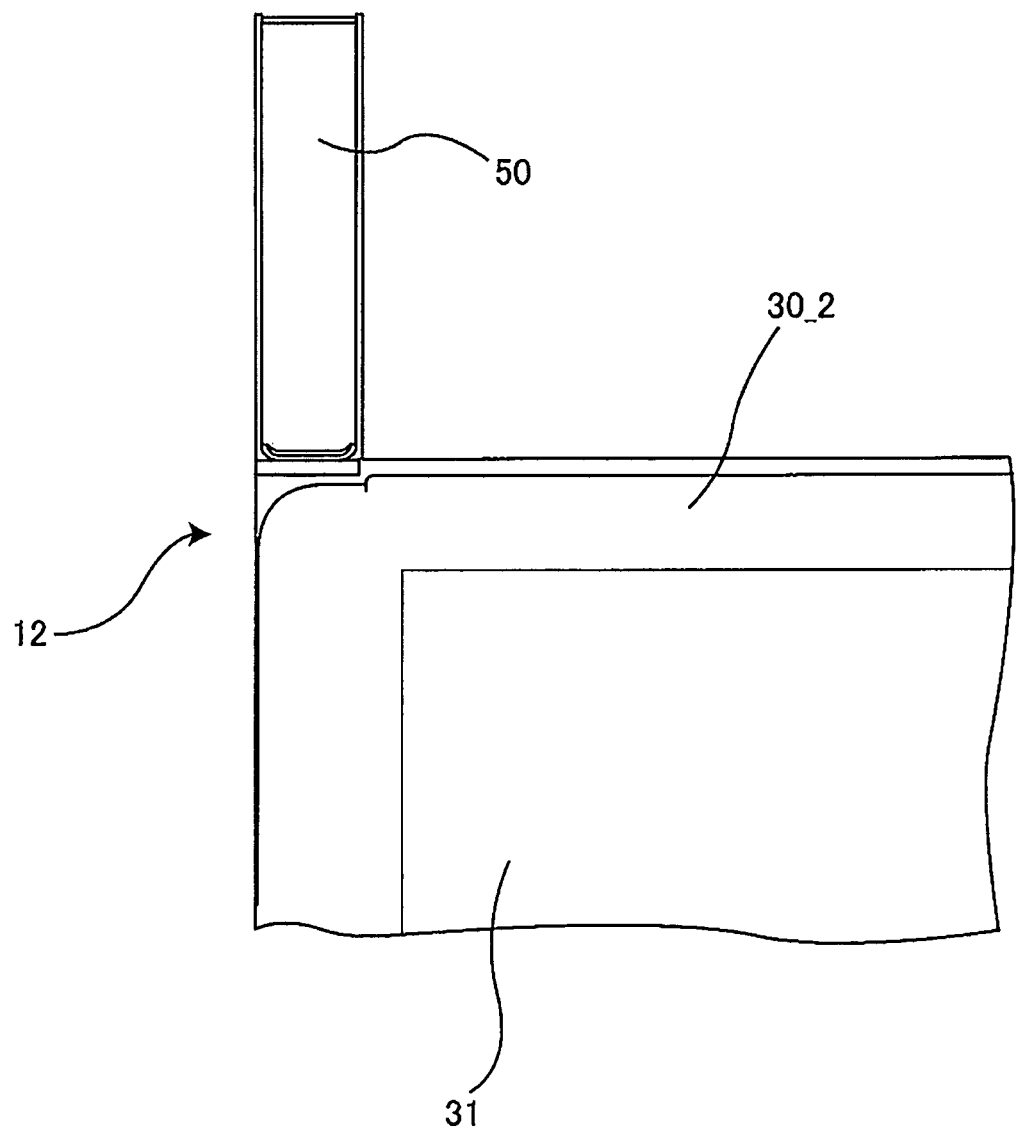
FIG. 19 is a view illustrating a state in which the housed antenna is erected at 90 degrees to the display unit.
Figure 20:
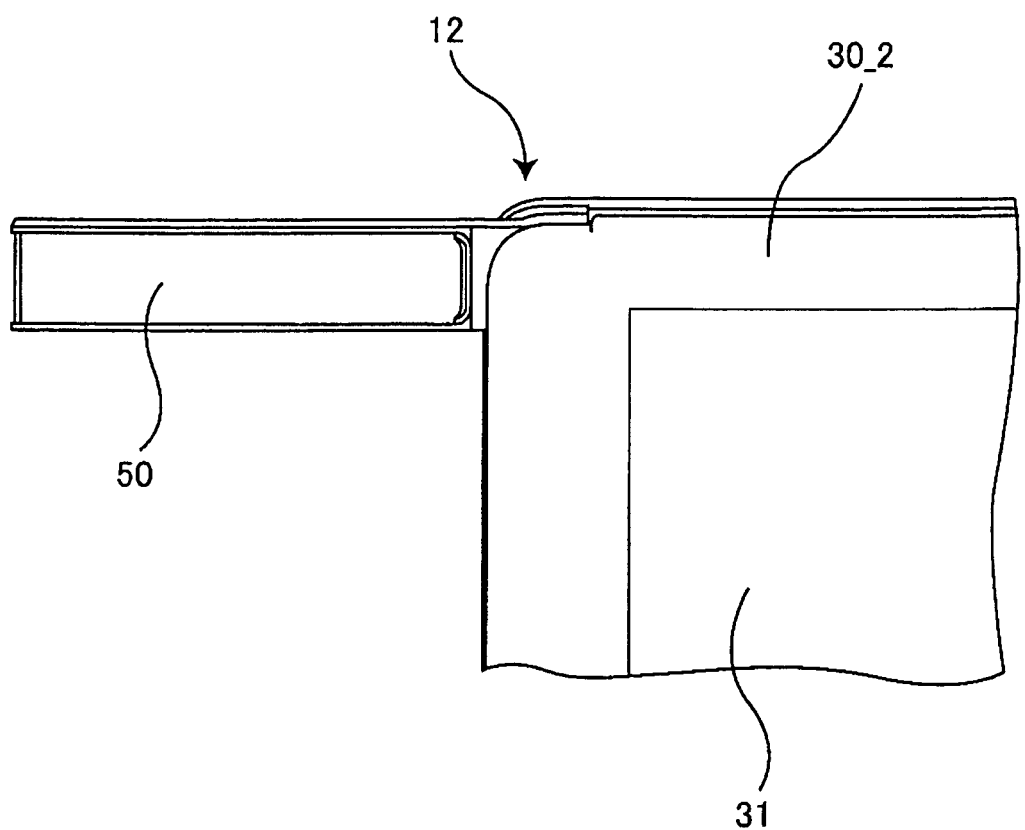
FIG. 20 is a view illustrating a state in which the housed antenna is erected at 180 degrees to the display unit.

FIG. 18 is a view illustrating a state in which the housed antenna 50 is housed in the display unit 30_2. FIG. 19 is a view illustrating a state in which the housed antenna 50 is erected at 90 degrees to the display unit 30_2. FIG. 20 is a view illustrating a state in which the housed antenna 50 is erected at 180 degrees to the display unit 30_2.

In the personal computer 12, the antenna housing groove 61 extends from a position closer to the center of the display unit 30_2 to the corner thereof in one side of the peripheral edge of the display unit 30_2. The housed antenna 50 can be adjusted to a first protruding position and a second protruding position. In the first protruding position, the housed antenna 50 is rotated about the boss 82_2A at 90 degrees from the housed position where it is housed in the display unit 30_2 and protrudes from the display unit 30_2. In the second protruding position, the housed antenna 50 is rotated about the boss 82_2A at 180 degrees from the housed position and protrudes from the display unit 30_2. Here, the side of the peripheral edge in which the antenna housing groove 61 is formed may be any side of an upper side of the display unit 30_2.

FIG. 21 is a view illustrating a positional relationship between the convex section 92 of the metal plate member 90 and the concave section 56 of the housed antenna 50.

Figure 21A:
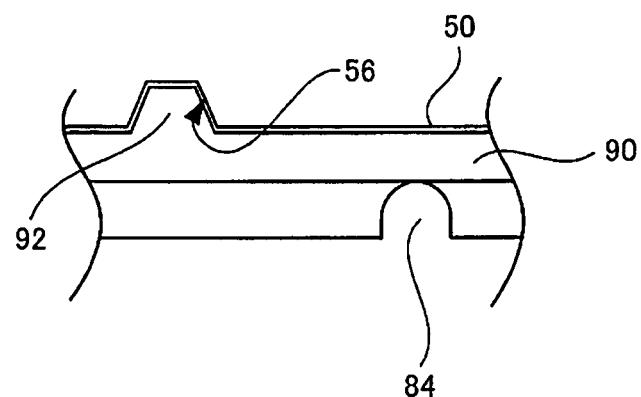
FIGS. 21A and 21B are views illustrating a positional relationship between a convex section of the metal plate member and a concave section of the housed antenna.

In a state in which the housed antenna 50 is housed in the display unit 30_2 as illustrated in FIG. 18, the convex section 92 of the metal plate member 90 is fitted into the concave section 56 of the housed antenna 50 as illustrated in FIG. 21A.

Figure 21B:
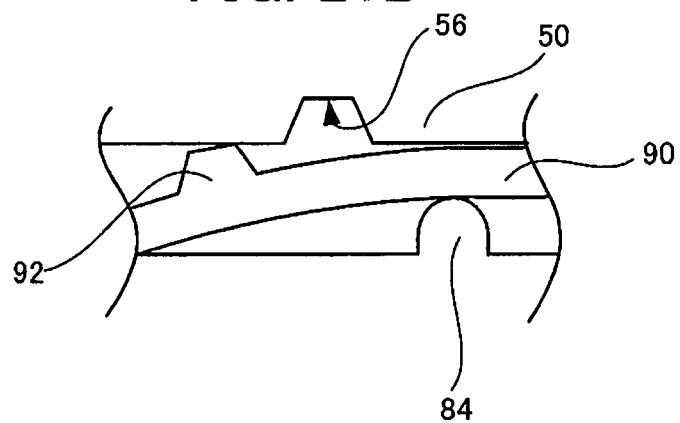

When the user pulls up the housed antenna 50, the housed antenna 50 rotates about the boss 82_2A, so that the convex section 92 of the metal plate member 90 is pulled out from the concave section 56 of the housed antenna 50 as illustrated in FIG. 21B. In the personal computer 12, the ribs 84 of the display unit 30_2 and the convex sections 92 of the metal plate member 90 are arranged at positions different from each other. Thus, when the housed antenna 50 is rotated, the convex section 92 is pushed down by the elasticity of the main body 91, thereby making it possible to release the engagement between the housed antenna 50 and the metal plate member 90.

When the housed antenna 50 is further rotated, the convex section 92 of the metal plate member 90 is fitted into the concave section 56 of the housed antenna 50 and the housed antenna 50 is locked with being erected at 90 degrees to the display unit 30_2 (see FIG. 19). When the housed antenna 50 is furthermore rotated from this state, the housed antenna 50 is locked with being erected at 180 degrees to the display unit 30_2 (see FIG. 20).

Accordingly, in the personal computer 12, the housed antenna 50 can be held at a different angle depending on a radio wave condition and a place to be used, thus making it possible to enlarge the range of use.

It is noted that in this embodiment, as an example is given in which the housed antenna 50 is mounted on the display units 30 and 30-2, the housed antenna 50 may be mounted on the main unit 20. Even in an embodiment in which the housed antenna 50 is mounted on the main unit 20, the housed antenna 50, which is movable between the housed position and the protruding position, can be mounted on the electronic apparatus without having a large space.

This ends the description of the antenna.

Backing to the personal computer 10 illustrated in FIG. 1, the display housing 34 of the personal computer 10 will be next described.

(Display Housing)

As illustrated in FIG. 12, the rear cover 34B of the display housing 34 has a structure in which the plastic part 110 surrounds the outer periphery of the metal part 120.

Figure 22:
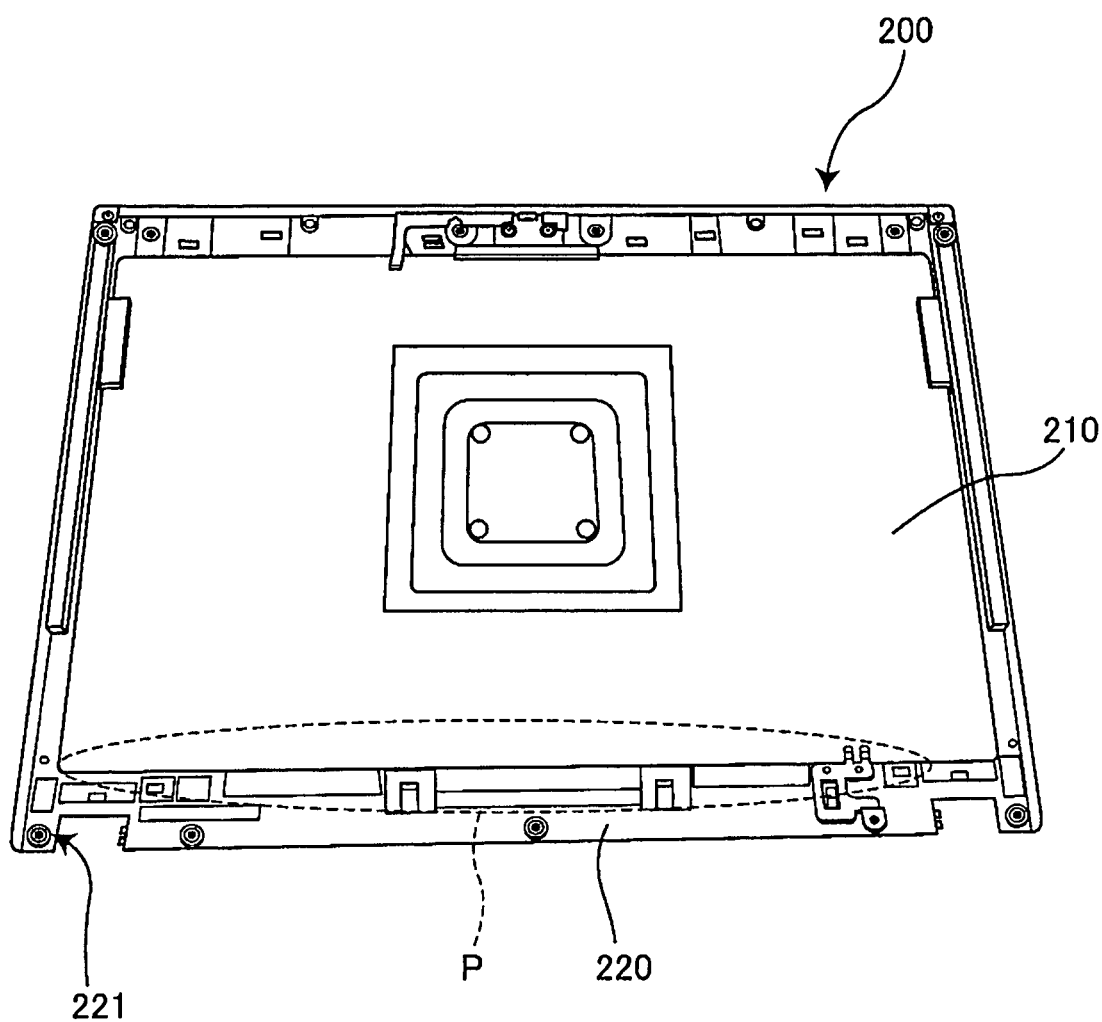
FIG. 22 is a view illustrating one example of a conventional rear cover.

FIG. 22 is a view illustrating one example of a conventional rear cover 200.

When the entire rear cover is formed of metal having high strength in order to protect the liquid crystal panel 31A from shock such as dropping, the built-in antenna is not able to be placed beside the liquid crystal panel 31A. For this reason, heretofore, the metal part 210, which is conformed to the shape of the liquid crystal panel 31A, is bonded to the plastic part 220, which is larger than the size of the liquid crystal panel 31A, as illustrated in FIG. 22. In the rear cover 200 having such a structure, when the display unit is opened and closed to the main unit, a strong force is applied to a portion near an attachment section 221 to which the connecting section is attached. The force concentrates on a bond boundary P on a side closer to the attachment section 221, and thus the metal part 210 may be removed from the plastic part 220 due to aging fatigue. In the personal computer 10 of this embodiment, such a defect is prevented by contriving an attaching surface of the plastic part and the metal part.

Figure 23:
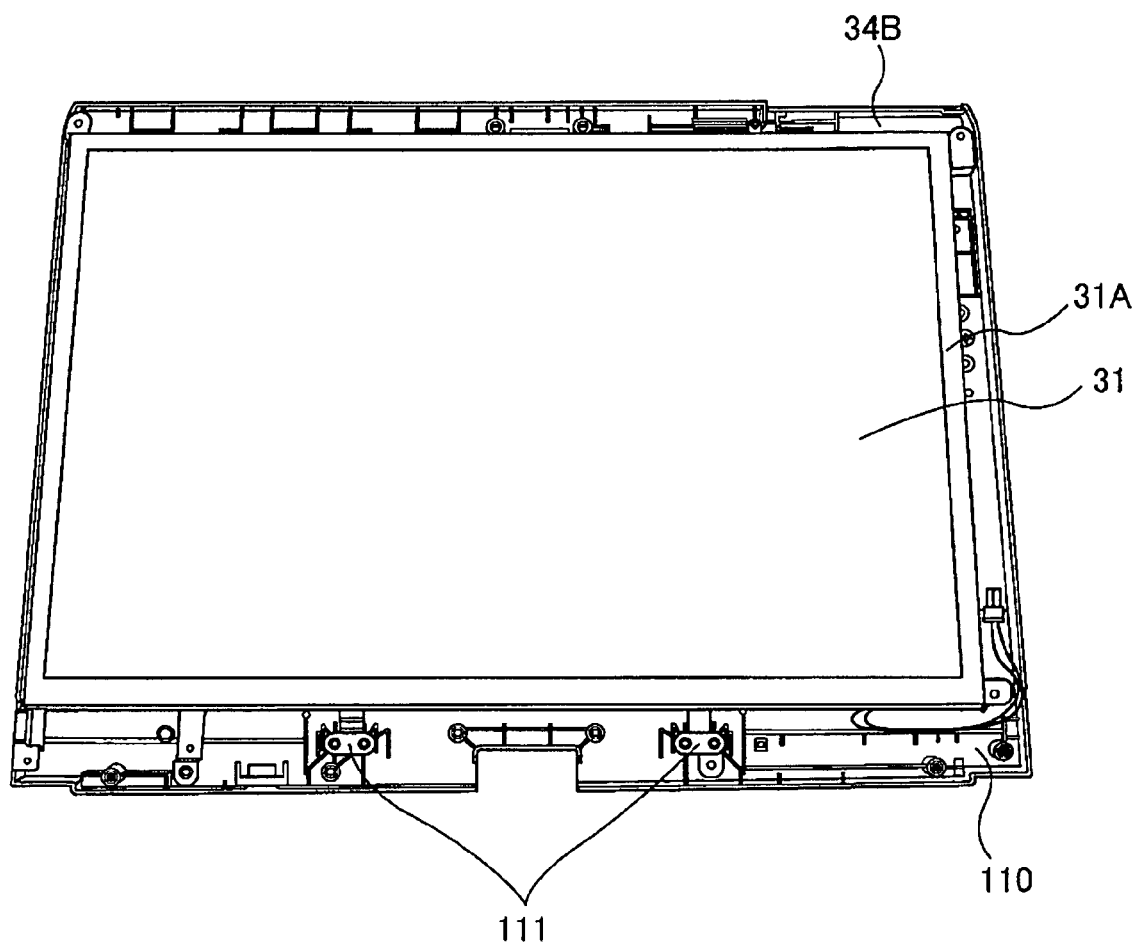
FIG. 23 is a view illustrating a front side, to which a liquid crystal panel is attached, of the rear cover.
Figure 24:
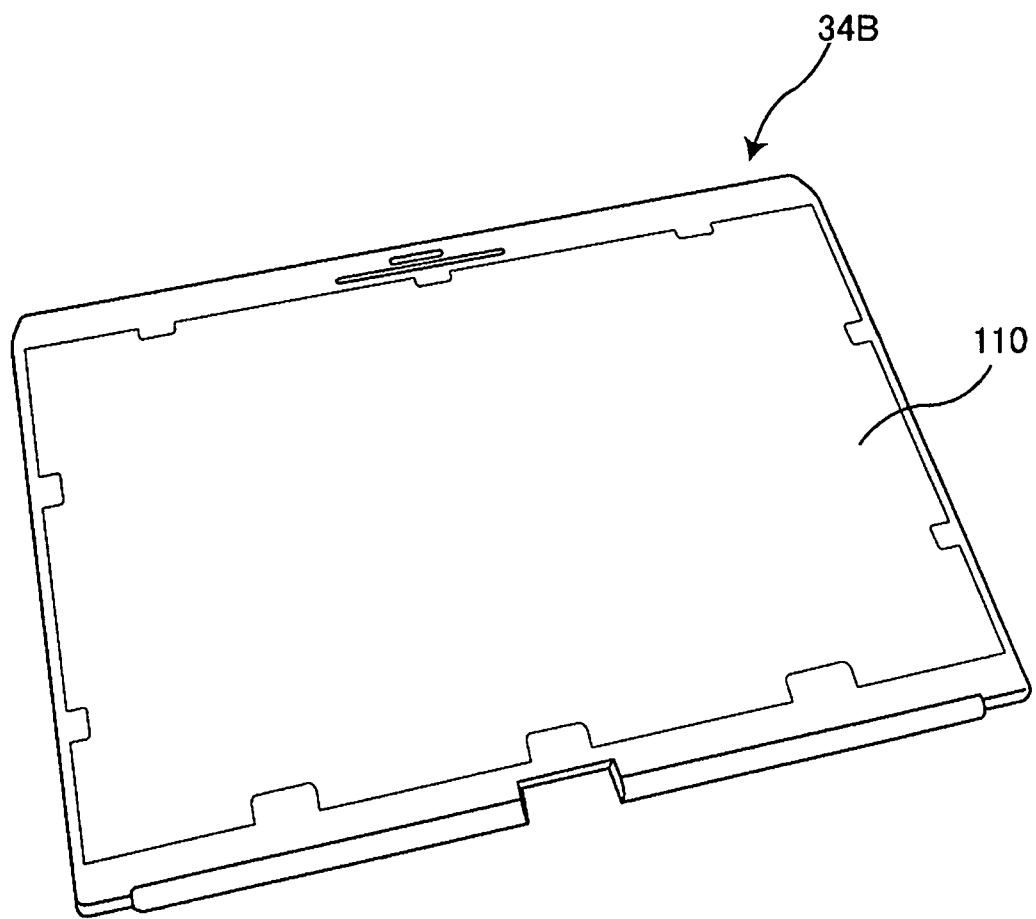
FIG. 24 is a view illustrating a rear side of the rear cover illustrated in FIG. 23.

FIG. 23 is a view illustrating a front side, to which the liquid crystal panel 31A is attached, of the rear cover 34B. FIG. 24 is a view illustrating a rear side of the rear cover 34B illustrated in FIG. 23.

On the front side of the rear cover 34B, the liquid crystal panel 31A is surrounded by the plastic part 110. The plastic part 110 forms an outer shape (rectangle) of the rear cover 34B. The plastic part 110 has at its lower end attachment sections 111 to which the connecting section 40 is attached.

Moreover, on the rear side of the rear cover 34B, the plastic part 110 is exposed over the entire surface. A decorative cover (not illustrated) is attached to the plastic part 110.

Figure 25:
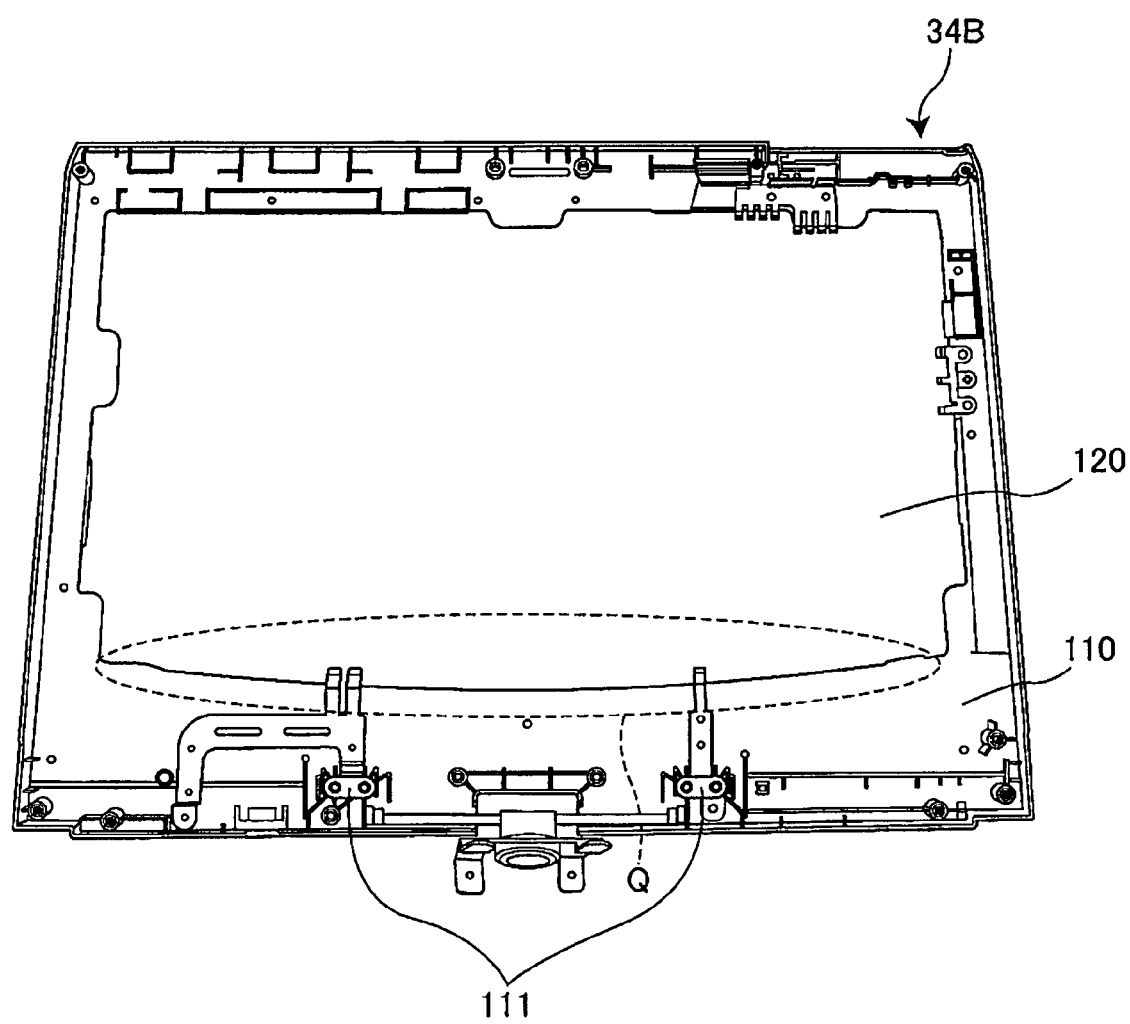
FIG. 25 is a view illustrating a state in which the liquid crystal panel is detached from the rear cover illustrated in FIG. 23.

FIG. 25 is a view illustrating a state in which the liquid crystal panel 31A is detached from the rear cover 34B illustrated in FIG. 23.

As illustrated in FIG. 25, the rear cover 34B is structured in such a manner that the metal part 120 is fitted into the front side of the plastic part 110 by integral molding and bonding. Further, as the plastic part 110 and the metal part 120 come closer to end portions, in a width direction, of the rear cover 34B, an attaching area therebetween is increased. A bond boundary Q therebetween has an arc shape extending in a width direction using the attachment sections 111 as poles. Therefore, a force to be applied to the connecting section 40 is dispersed without concentrating on the bond boundary Q between the plastic part 110 and the metal part 120, thereby making it possible to prevent a defect in which the metal part 120 is removed from the plastic part 110.

Moreover, in FIG. 25, the bond boundary Q between the plastic part 110 and the metal part 120 has an arc shape extending in a width direction using the attachment sections 111 as poles. However, the attaching surface of the plastic part 110 and the metal part 120 may be formed in any shape as long as the attaching area is different between the central portion and the end portions in the width direction of the rear cover 34B.

Figure 26:
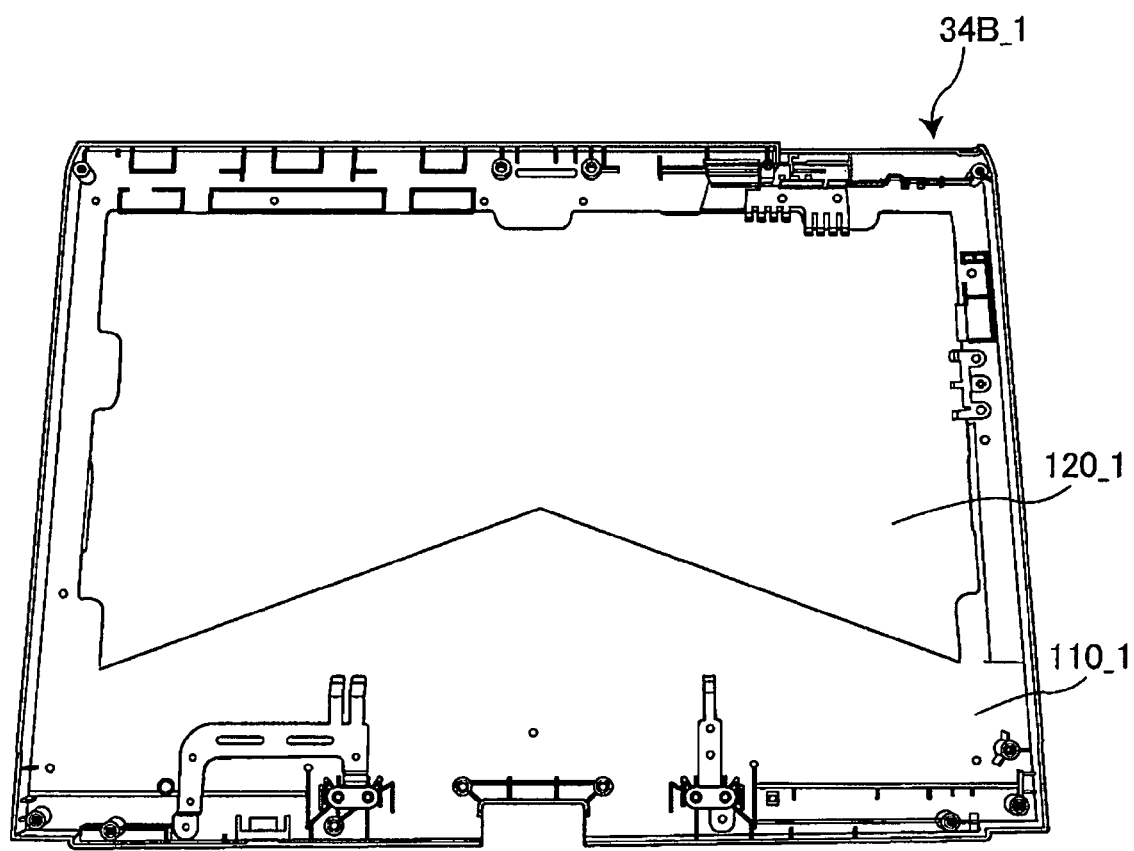
FIG. 26 is a view illustrating one example of a rear cover of a version different from that illustrated in FIG. 25.

FIG. 26 is a view illustrating one example of a rear cover of a version different from that in FIG. 25.

On a rear cover 34B_1, an area of an attaching surface of a plastic part 110_1 and a metal part 120_1 is increased toward the central portion in a width direction of a rear cover 34B_1, and a bond boundary therebetween has a linear shape. Thus, even when the attaching area between the plastic part 110_1 and the metal part 120_1 is decreased toward end portions in the width direction of the rear cover 34B_1, this provides an effect of reducing a defect in which the metal part 120_1 is removed from the plastic part 110_1.

It is noted that, in addition to general plastic, reinforced plastic containing glass fiber or carbon may be used as material for the plastic parts 110 and 110_1. Further, it is possible to use magnesium alloy, aluminum, titanium or the like as material for the metal parts 120 and 120_1. Furthermore, the metal parts 120 and 120_1 may be replaced with parts of other material such as a carbon plate or the like.

Sequentially, a description will be given of a method of attaching a keyboard of the personal computer 10.

(Keyboard Attachment Method)

The main housing 25 illustrated in FIG. 1 houses electronic components in the space formed of the upper cover 25A and the lower housing 25B. Moreover, the upper cover 25A has a resin-made keyboard, with the multiple keys 21 arranged, mounted on its upper surface and a connecting section cover 310 (see FIG. 27) for covering the connecting section 40 fit thereto.

Figure 27:
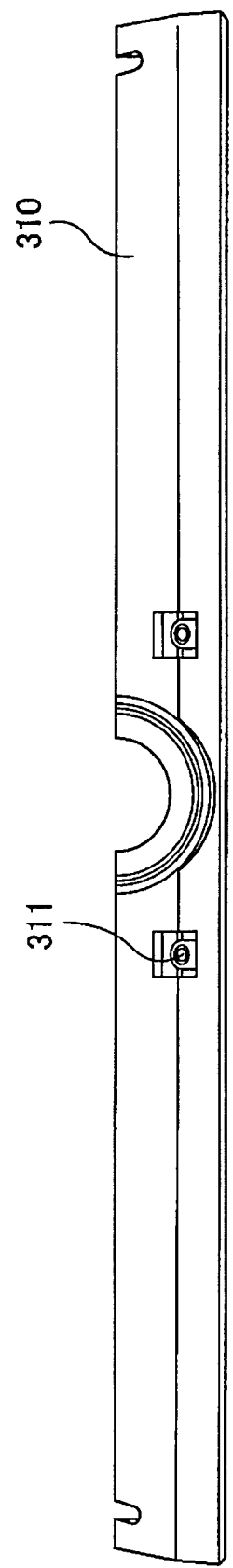
FIG. 27 is an enlarged view of a connecting section cover.
Figure 28:
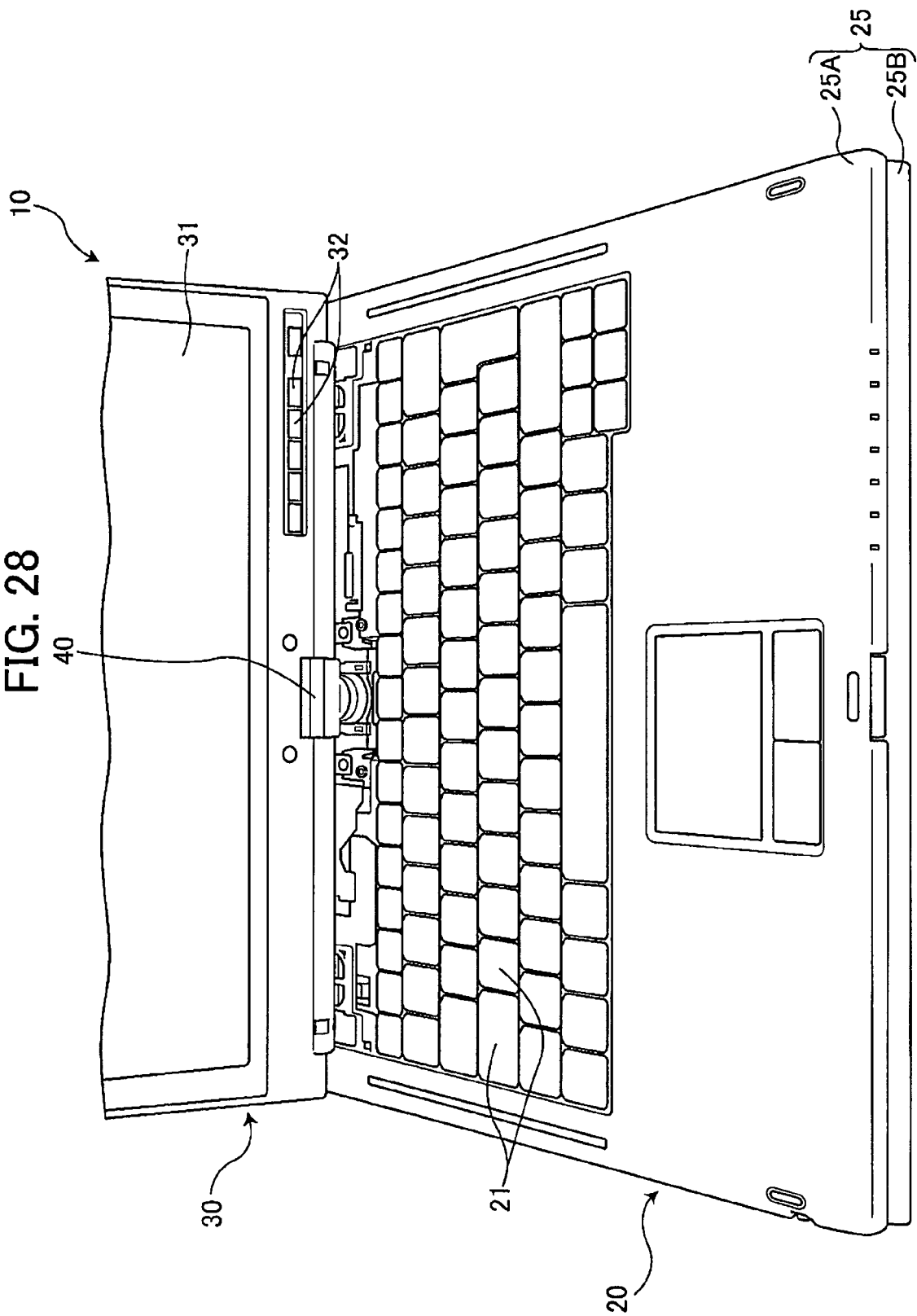
FIG. 28 is a view illustrating the personal computer from which the connecting section cover is detached.

FIG. 27 is an enlarged view of the connecting section cover 310. FIG. 28 is a view illustrating the personal computer 10 from which the connecting section cover 310 is detached.

As illustrated in FIG. 27, the connecting section cover 310 has screw holes 311 for fixing the connecting section cover 310 and the main unit 20 to each other. As illustrated in FIG. 28, the connecting section 40, wires, and the like are exposed in the state where the connecting section 40 is attached to the main unit 20. The connecting section cover 310 is attached to the main unit 20 for covering up these parts.

Figure 29:
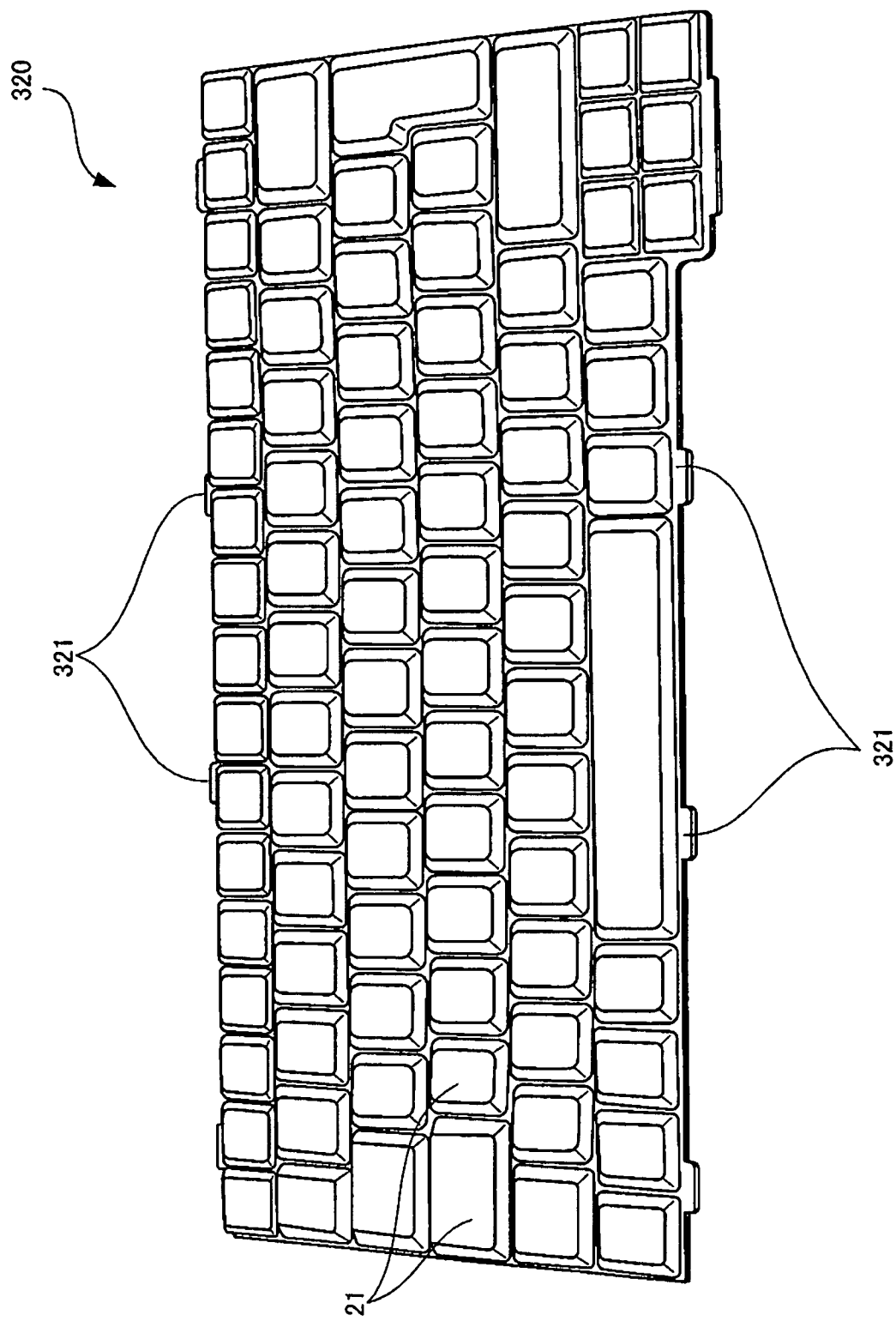
FIG. 29 is a view illustrating a keyboard.
Figure 30:
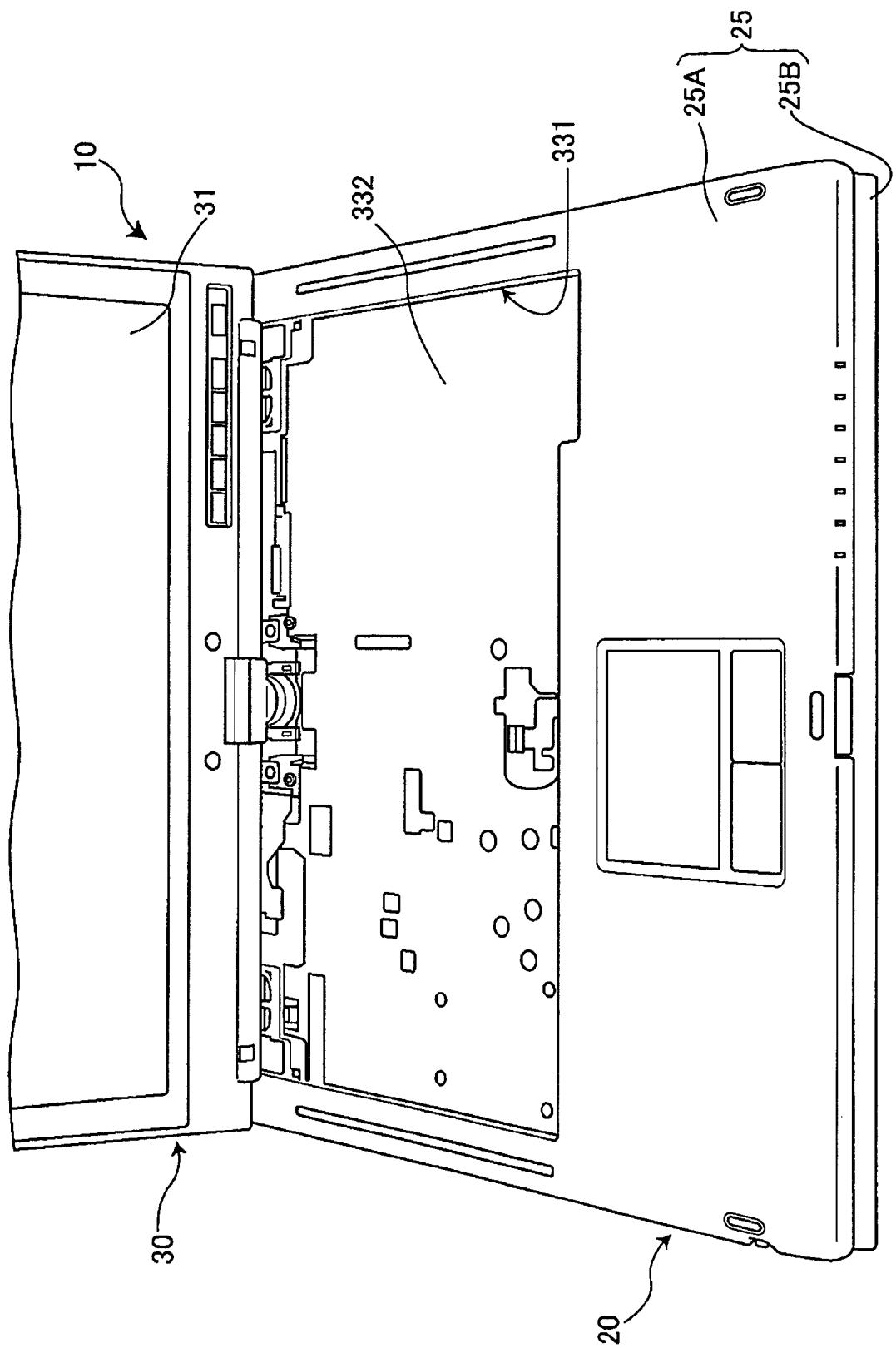
FIG. 30 is a view illustrating the personal computer from which the keyboard is detached.

FIG. 29 is a view illustrating a keyboard 320. FIG. 30 is a view illustrating the personal computer 10 from which the keyboard 320 is detached.

The keyboard 320 is formed of a sheet and the multiple keys 21 arranged on the sheet in a predetermined matrix. Moreover, at front and rear peripheral edge portions of the basic body of the keyboard 320, the keyboard 320 has multiple attachment pieces 321, which protrude from a peripheral portion of the keyboard 320, for attaching the keyboard 320 to the upper cover 25A of the main unit 20. The attachment pieces 321 are one example of the attachment section. As illustrated in FIG. 30, the upper cover 25A has an opening 331. A metal plate 332 is fixed to the main unit 20 so as to cover the opening 331.

Figure 31:
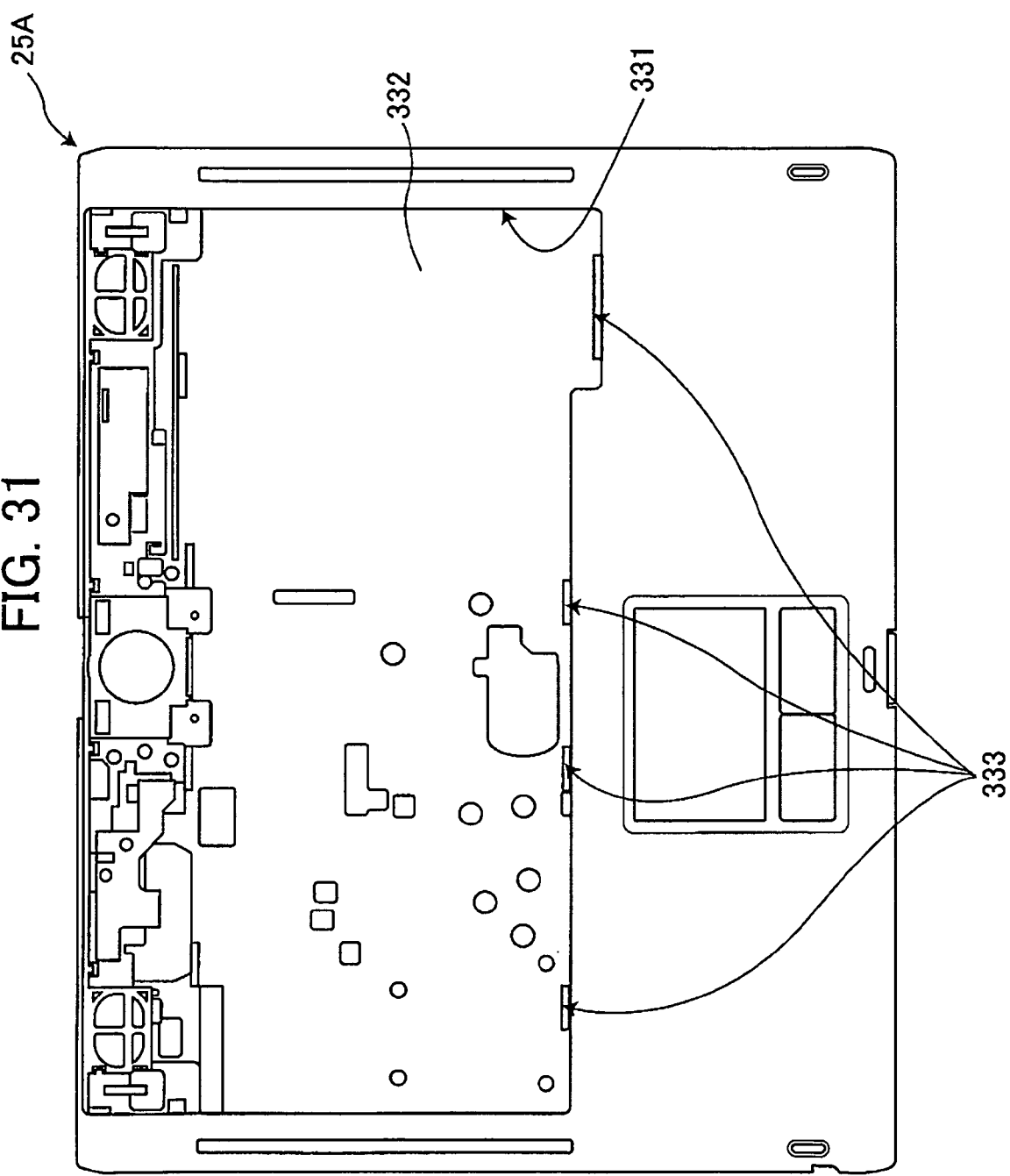
FIG. 31 is a view illustrating an upper surface of an upper cover.
Figure 32:
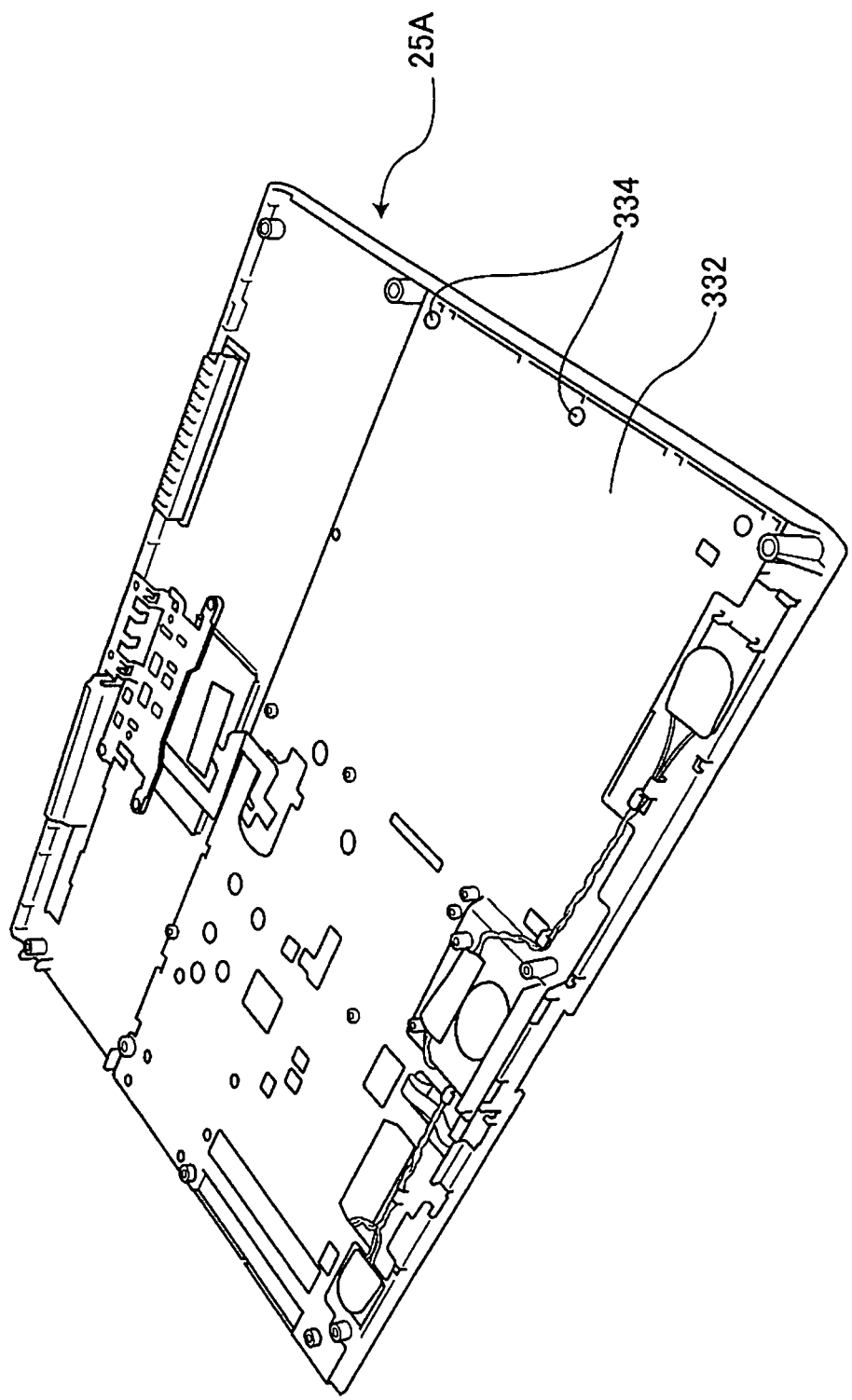
FIG. 32 is a view illustrating a lower surface of the upper cover.

FIG. 31 is a view illustrating an upper surface of the upper cover 25A. FIG. 32 is a view illustrating a lower surface of the upper cover 25A.

The upper cover 25A has multiple attachment openings 333. The attachment openings 333 are one example of the fixing section. The keyboard 320 is mounted on the metal plate 332 in such a manner that the attachment pieces 321 are inserted into the attachment openings 333 and fixed onto the metal plate 332. Further, as illustrated in FIG. 32, the metal plate 332 is fixed to the lower surface of the upper cover 25A by screws 334 so as to cover the opening 331 illustrated in FIG. 31 from the lower surface side.

Figure 33:
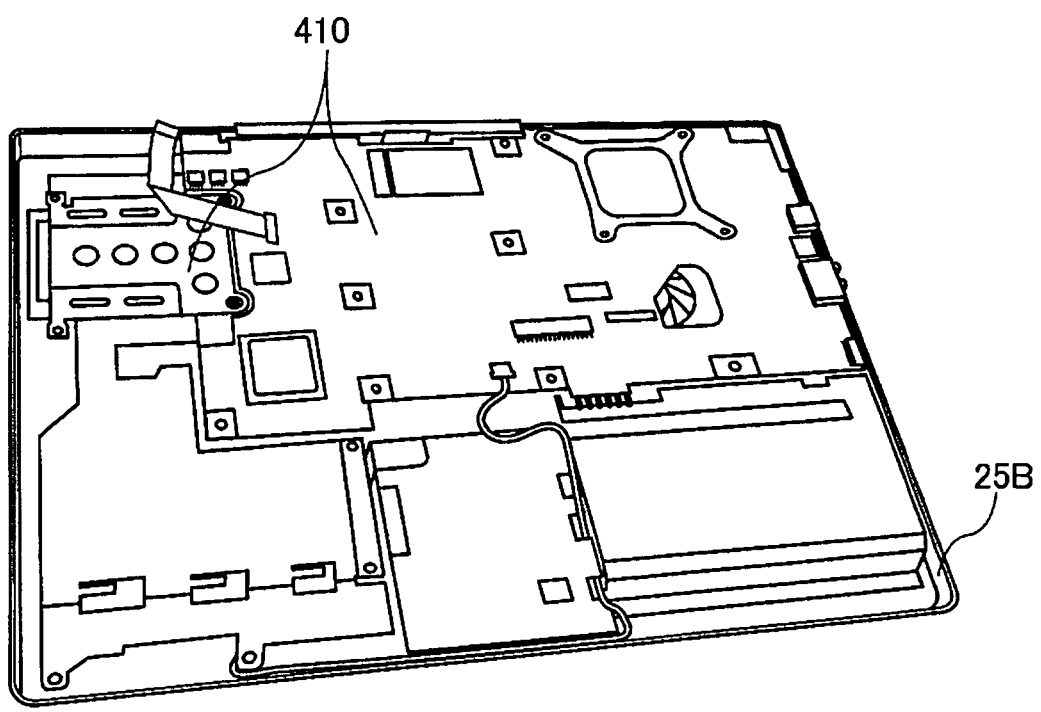
FIG. 33 is a view illustrating a state in which the upper cover is detached from the main unit.

FIG. 33 is a view illustrating a state in which the upper cover 25A is detached from the main unit 20.

The lower housing 25B houses electronic components 410 such as a hard disk device, various boards and the like. When the upper cover 25A is fixed to the lower housing 25B, the electronic components 410 come in contact with the metal plate 332 which is fitted into the upper cover 25A. In this way, the portion of the upper cover 25A on which the keyboard 320 is mounted is formed of metal, whereby heat generated by the electronic components 410 is absorbed and dissipated by the metal plate 332.

The upper cover 25A is attached to the lower housing 25B illustrated in FIG. 33 and the attachment pieces 321 of the keyboard 320 are inserted into the attachment openings 333 of the upper cover 25A, whereby the keyboard 320 is mounted on the metal plate 332. Here, as a structure for mounting the keyboard 320 on the upper cover 25A, it is possible to use a structure that fixes the attachment pieces 321 to the upper cover 25A by screws, and a structure that provides a slide type claw on the keyboard 320 to hook the claw on the upper cover 25A. Moreover, it may be possible to use a structure that screws the attachment pieces 321 of the keyboard 320 to the upper cover 25A.

Figure 34:
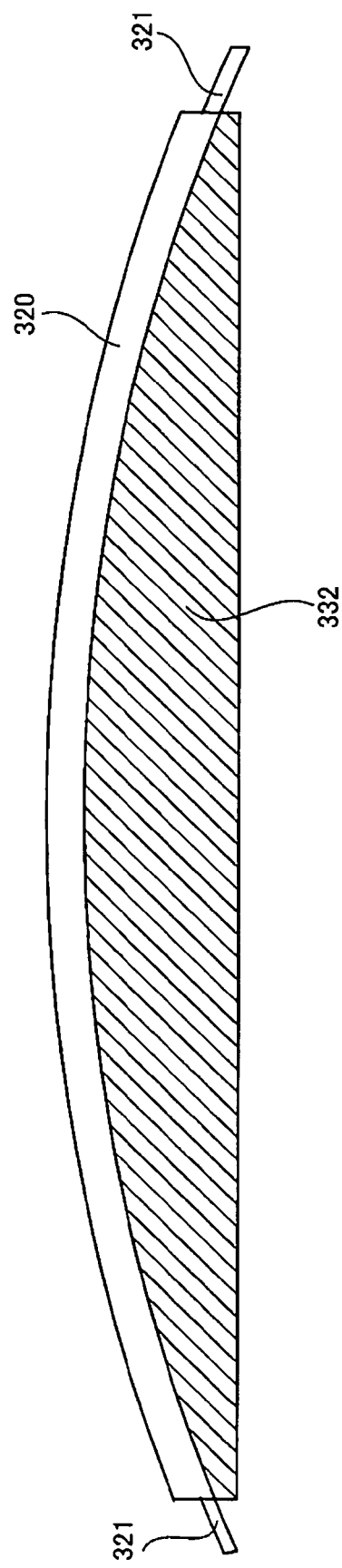
FIG. 34 is a cross-sectional view illustrating a state in which the keyboard mounted on a metal plate is cut in a depth direction of the personal computer.

FIG. 34 is a cross-sectional view illustrating a state in which the keyboard 320 mounted on the metal plate 332 is cut in a depth direction of the personal computer 10.

As illustrated in FIG. 34, the metal plate 332 is formed so that front and rear end sides thereof, where the attachment pieces 321 of the keyboard 320 are provided, may be thin and the other portion may be thicker toward the central portion thereof away from the sides where the attachment pieces 321 are provided. Therefore, the keyboard 320 is mounted in a state in which it is upwardly curved in an arc shape where the front and rear end sides are used as end portions, thereby making it possible to reduce a feeling that a key on the keyboard 320 is sinking when the user depresses the keys on the keyboard 320.

The cross-section of the metal plate 332 may have a shape where only the central portion rises, in addition to the shape that smoothly rises in the depth direction from the surrounding of the keyboard to the portion close to the center as illustrated in FIG. 34. Moreover, instead of forming the risen shape on the basis of a difference in thickness, the central portion of a metal plate having a uniform thickness may be narrowed to form a stepped portion so as to be used as the equivalent shape. Further, the structure may be formed by using multiple parts, instead of using a single part, such that, for example, a flat plate and a different part bonded onto the flat plate may form a shape where the central portion rises. In this case, the number of parts to be bonded may be single or multiple.

In this embodiment, the keyboard 320 is structured so that the cross section in the front and back direction (depth direction) of the keyboard 320 may have a convex shape. However, the keyboard 320 may be structured so that the cross section in the left and right direction of the keyboard 320 may have a convex shape. In this case, the attachment pieces 321 of the keyboard 320 are formed at side ends of the keyboard 320.

Figure 35:
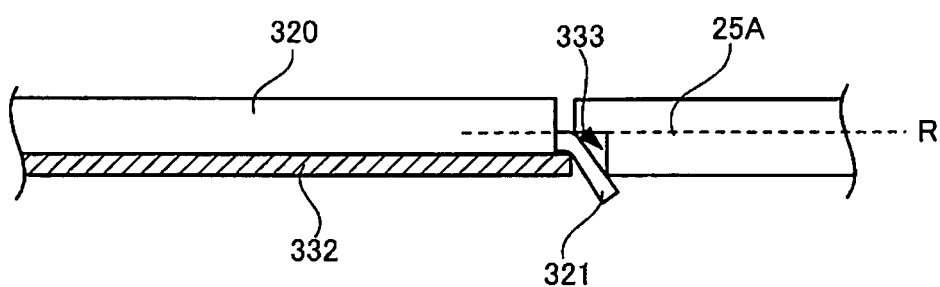
FIG. 35 is a cross-sectional view illustrating a portion near an attachment piece in a state in which the keyboard is attached to the upper cover.

FIG. 35 is a cross-sectional view illustrating a portion close to the attachment piece 321 in a state where the keyboard 320 is attached to the upper cover 25A.

As illustrated in FIG. 35, the attachment openings 333 formed on the upper cover 25A are formed under the position where the attachment pieces 321 of the keyboard 320 are provided. Accordingly, the attachment pieces 321 enter the lower side than a reference surface R horizontal to the attachment pieces 321 and are fixed to the upper cover 25A, and therefore the keyboard 320 is curved upwardly. In this manner, the attachment openings 333 are formed under the reference surface R, thereby making it possible to more surely curve the keyboard 320 upwardly and maintain a good operational feeling of the keyboard 320 for a long time.

Actually, by curving the keyboard 320 upwardly by 0.1 mm with respect to the metal plate 332, a sense of discomfort like a spongy touch when depressing keys 21 is eliminated and a good operational feeling can be obtained.

A description will be next given of a method for attaching the connecting section 40 to the main housing 25.

(Method for Attaching the Connecting Section)

Figure 36:
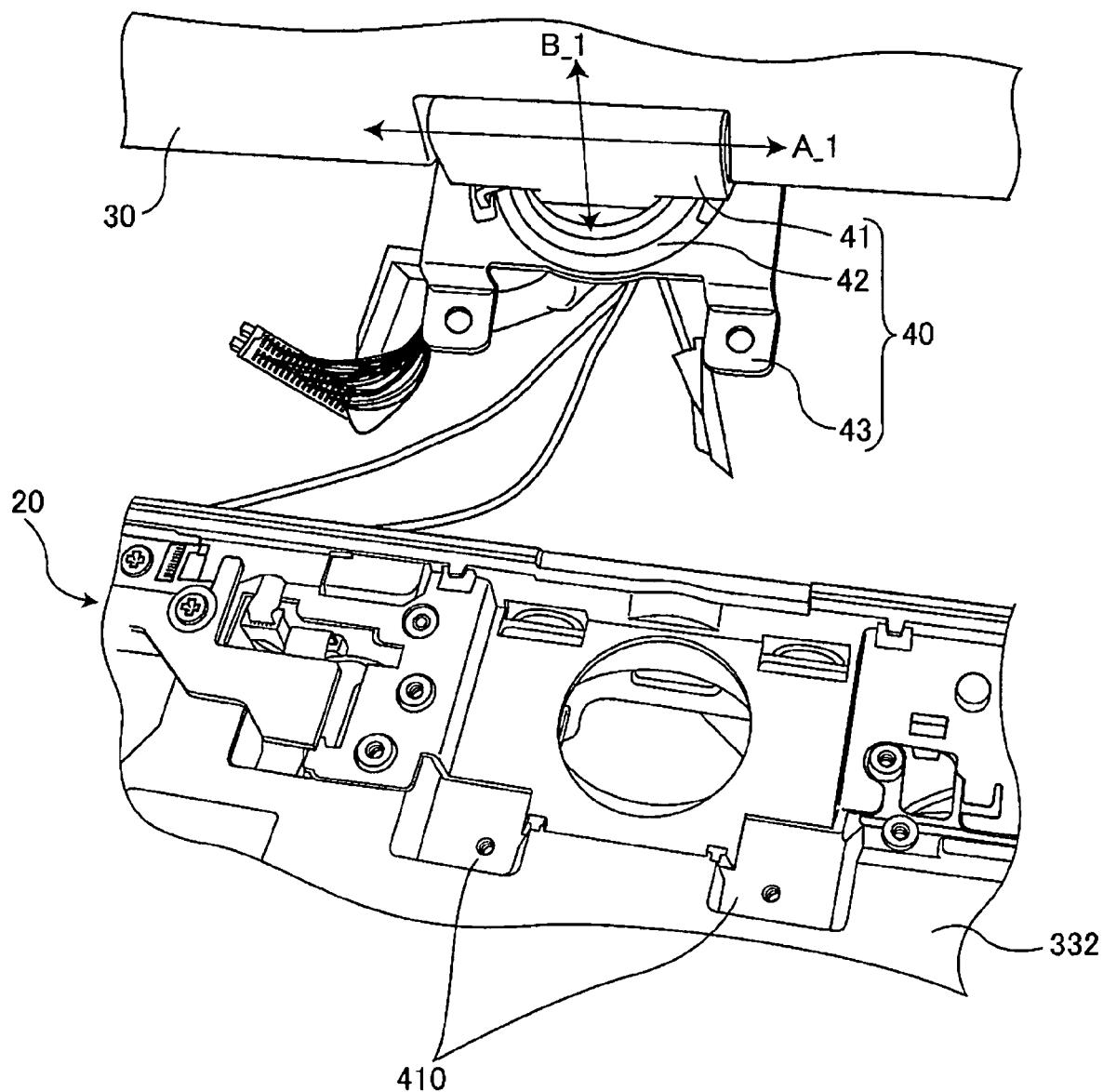
FIG. 36 is an enlarged view illustrating a state in which a connecting section before being attached to a main housing is seen from the front thereof.
Figure 37:
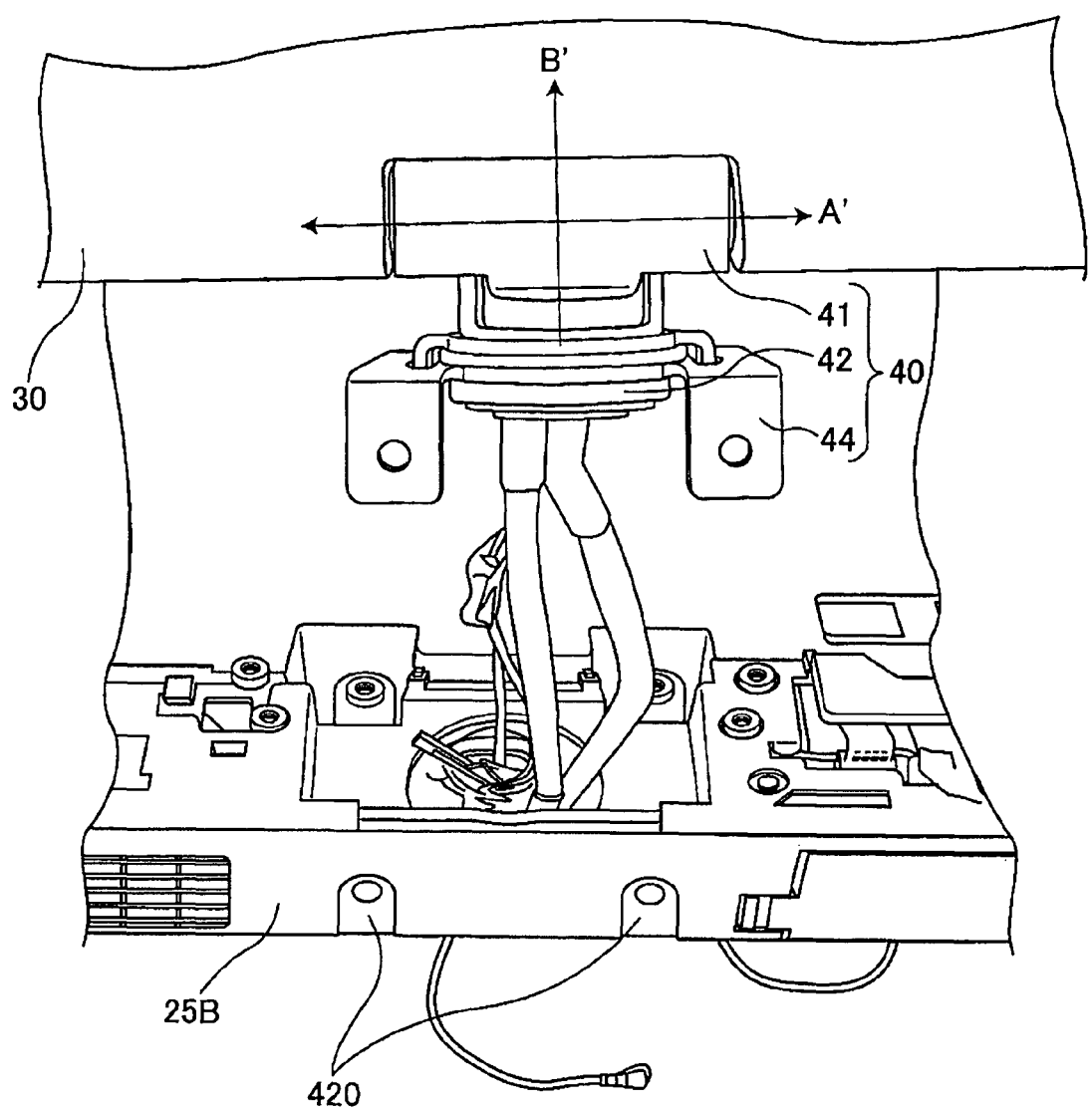
FIG. 37 is an enlarged view illustrating a state in which the connecting section before being attached to the main housing is seen from the rear thereof.

FIG. 36 is an enlarged view illustrating a state in which the connecting section 40 before being attached to the main housing 25 is seen from the front. FIG. 37 is an enlarged view illustrating a state in which the connecting section 40 before being attached to the main housing 25 is seen from the rear.

The connecting section 40 has a first member 41, a second member 42, front fastening sections 43 and rear fastening sections 44. The first member 41 opens and closes the display unit 30 about a horizontal first axis (direction of an arrow A_1). The second member 42 rotates the display unit 30 about a second axis (direction of an arrow B_1) crossing the first axis. The front fastening sections 43 are screwed to fixed positions 410 formed on the metal plate 332 of the main housing 25 on the front side. The back fastening sections 44 are screwed to fixed positions 420 formed on the lower housing 25B of the main housing 25 on the rear side. The front side of the main housing 25 corresponds to one side and the rear side thereof corresponds to the other side facing the front side.

Figure 38:
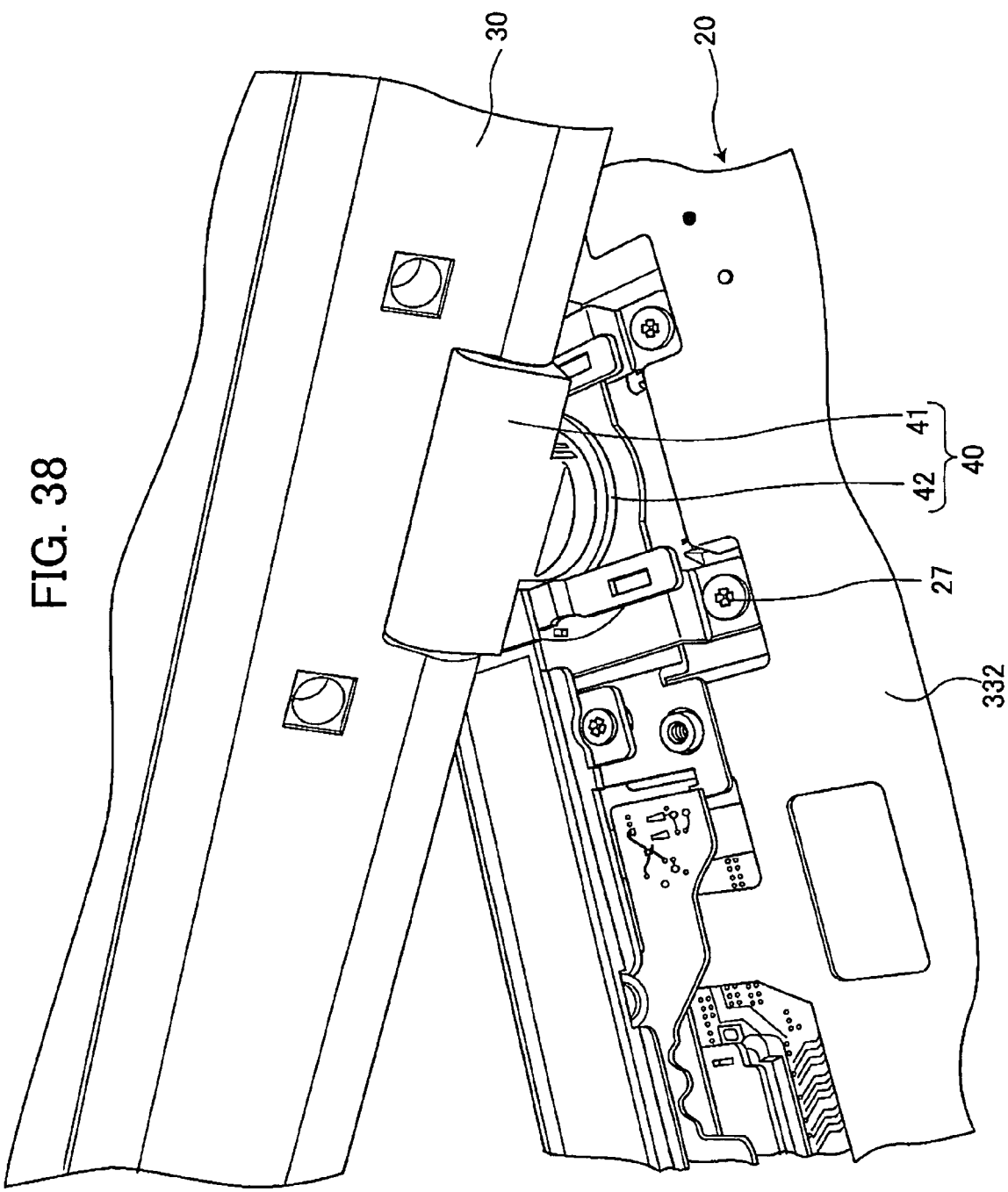
FIG. 38 is an enlarged view illustrating a state in which the connecting section after being attached to the main housing is seen from the front thereof.
Figure 39:
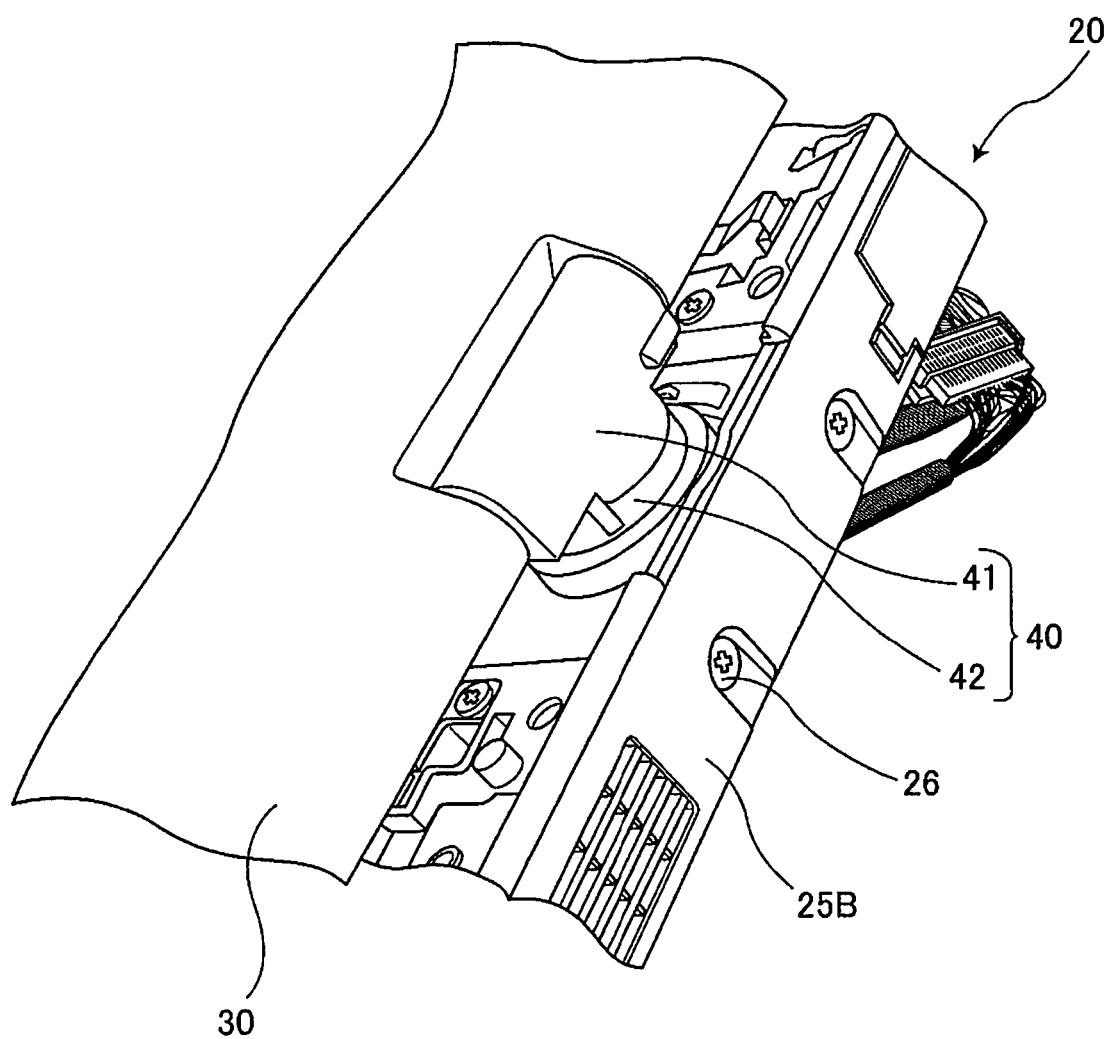
FIG. 39 is an enlarged view illustrating a state in which the connecting section after being attached to the main housing is seen from the rear thereof.

FIG. 38 is an enlarged view illustrating a state in which the connecting section 40 after being attached to the main housing 25 is seen from the front. FIG. 39 is an enlarged view illustrating a state in which the connecting section 40 after being attached to the main housing 25 is seen from the rear.

The connecting section 40 is fixed to the metal plate 332 on the front side of the personal computer 10 by fastening screws 27 to the front fastening sections 43, and is fixed to the lower housing 25B on the rear side of the personal computer 10 by fastening the screws 26 to the rear fastening sections 44.

Figure 40:
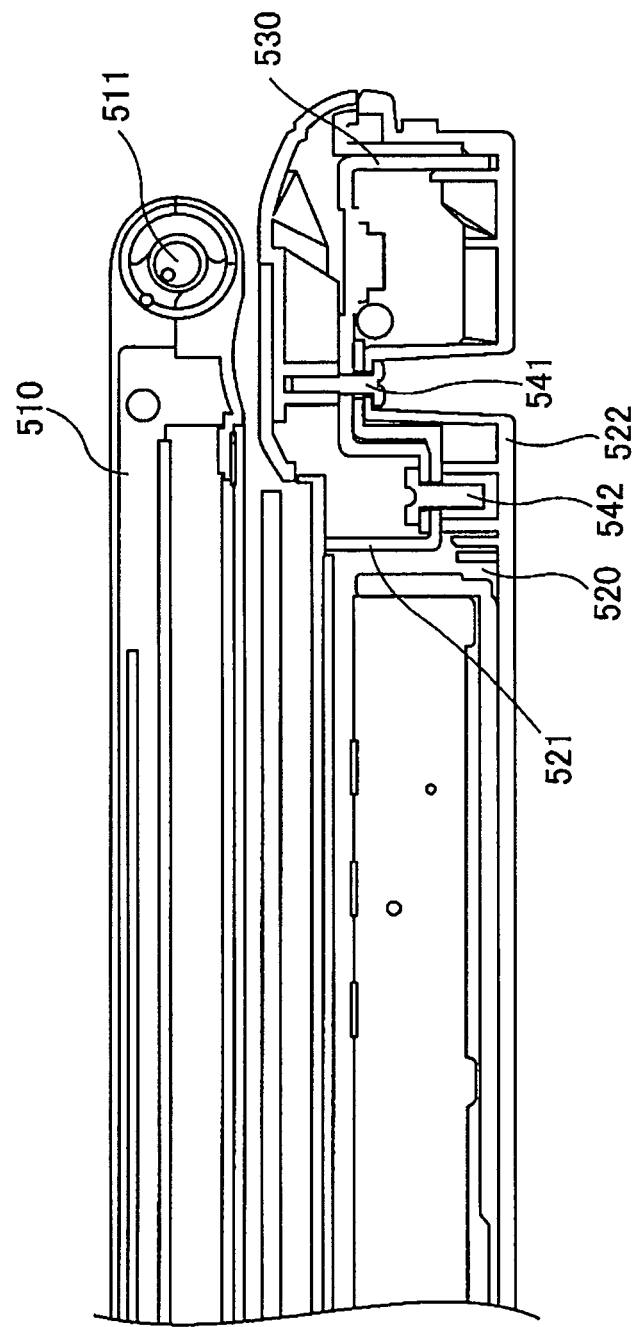
FIG. 40 is a cross-sectional view illustrating a state in which a conventional personal computer is cut in a depth direction.

FIG. 40 is a cross-sectional view illustrating a state in which a conventional personal computer is cut in a depth direction.

As illustrated in FIG. 40, in the conventional personal computer, a connecting section 530 is fixed to a lower housing 522 by pinching an upper cover 521 of a main unit 520 with screws 542, and is fixed to the lower housing 522 in front of a shaft 511 of a display unit 510 by screws 541. Therefore, when the connecting section 530 is pulled relative to the main unit 520 at the time of opening and closing the display unit 510, there is a possibility that a defect will occur in which a surface of the upper cover 521 fixed to the connecting section 530 by the screws 541 and 542 is distorted as if it swelled on the surface.

Figure 41:
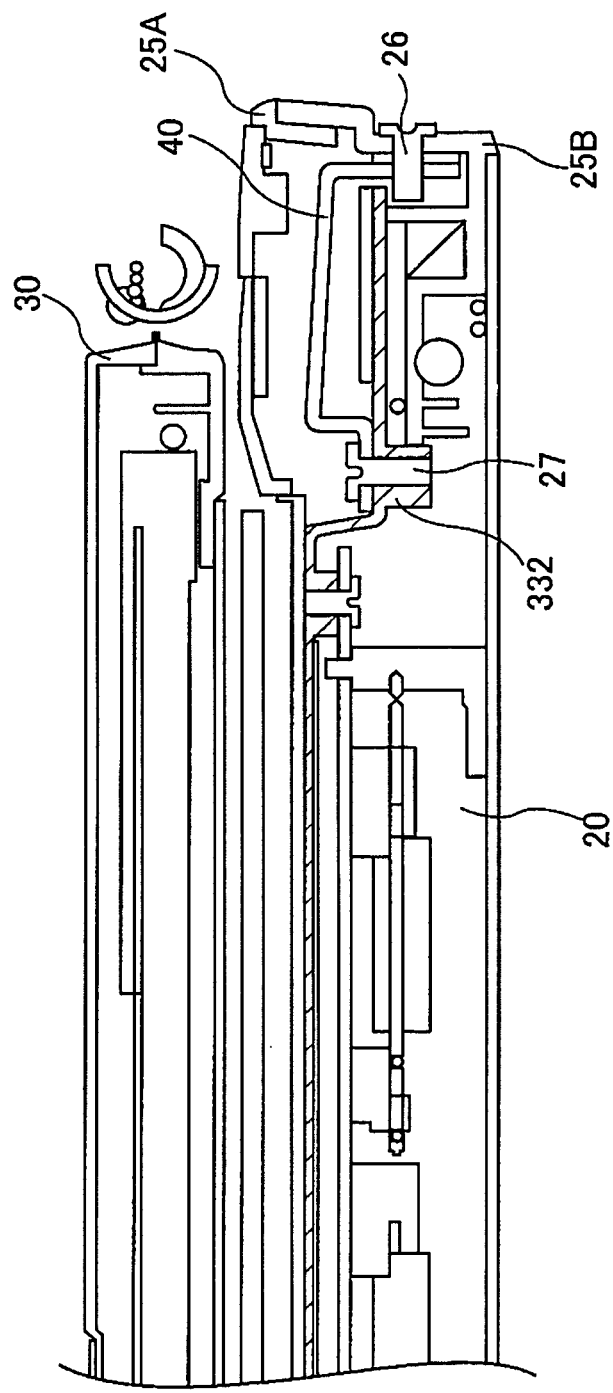
FIG. 41 is a cross-sectional view illustrating a state in which the personal computer of this embodiment is cut in a depth direction.

FIG. 41 is a cross-sectional view illustrating a state in which the personal computer 10 of this embodiment is cut in a depth direction.

In the personal computer 10 of this embodiment, the connecting section 40 is fixed to the metal plate 332 by the screws 27. Even when the connecting section 40 is pulled at the time of opening and closing the display unit 30, the force is transmitted to the upper cover 25A through the metal plate 332, and therefore it is possible to prevent the upper cover 25A from being deformed. Moreover, the connecting section 40 is also fixed to the lower housing 25B on the rear side of the main unit 20 by the screws 26. However, it is fixed at a position away from the surface of the upper cover 25A, and therefore it is possible to reduce an influence on the upper cover 25A.

Thus, according to the personal computer 10 of this embodiment, it is possible to reduce the defect in which the surface of the upper cover is distorted at the time of opening and closing the display unit.

The tablet type personal computer has been taken as an example of the electronic apparatus above; however, the electronic apparatus disclosed in the present case may be applied to a personal computer having no tablet function such as a PDA, a game machine, an electronic notebook, and the like.

Furthermore, the liquid crystal panel has been taken as an example of the display panel above; however, the display panel to be mounted on the electronic apparatus disclosed in the present case may be a plasma display, a field emission display, an organic EL display, or the like.

According to the basic aspect of the electronic apparatus disclosed in the present case, the antenna housing groove extending in the extension direction is formed on one end surface of the housing, and the boss protruding in the width direction in the antenna housing groove is inserted into the insertion opening of the antenna body. Thereby, the antenna body is attached in the groove so as to be housable therein. Further, the metal plate member interferes with the bearing member to thereby hold the antenna body at both the protruding position and the locked position. Thereby, the antenna can be easily erected and housed in a narrow space, and this makes it possible to fix an angle of the antenna body with a simple structure while suppressing an increase in size of the apparatus.

According to the present invention, it is possible to mount an antenna which can be easily erected and housed in a narrow space on an electronic apparatus with a simple structure.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. An electronic apparatus comprising:
a housing that houses an electronic component and has a rectangular plate shape, and that includes a metal member, an antenna housing groove being formed on one end surface of the housing and extending in an extension direction of the one end surface and a boss protruding in the antenna housing groove in a width direction of the antenna housing groove at one end portion of the antenna housing groove, the metal member being provided with a standing boss, the metal member being fixed to an inner wall of the antenna housing groove, and the metal member having a plate shape;
an antenna body that includes a plate piece shape having a length to be housed in the antenna housing groove and an antenna for radio communication, and that includes in one end portion of the antenna body a bearing member having an insertion opening which passes through front and rear surfaces of the antenna body to receive insertion of the boss, the bearing member electrically conducting to the antenna; and
a metal plate member through which the boss is inserted and which is sandwiched between the metal member of the housing and the antenna body to interact with the bearing member, that electrically grounds the antenna of the antenna body to the metal member of the housing, that is locked in both locked positions of a housed position in which the antenna body is housed in the antenna housing groove and in a protruding position in which the antenna body is rotated from the housed position by a predetermined angle and protrudes from the housing so that the metal plate member holds the positions of the antenna body, and that releases the lock upon reception of a force in a rotational direction of the antenna body, wherein
the bearing member has an engaging concave section on a surface coming in contact with the metal plate member,
the metal plate member has an elastic convex section that is fitted into the engaging concave section when the antenna body is in the locked positions, and is elastically deformed and detached from the engaging concave section by the rotation of the antenna body, an elastic engaging section which surrounds the boss and has the elastic convex section, and a ground leg piece which extends from the elastic engaging section and elastically press-contacts an inner wall of the antenna housing groove at a position adjacent to a base of the boss, and
the metal plate member interferes with the bearing member so as to electrically ground the antenna by a conductive path that runs through the engaging concave section, the elastic convex section, the ground leg piece and the bearing member with the metal member.

2. The electronic apparatus according to claim 1, wherein the protruding position is obtained when the antenna body rotates by 90 degrees from the housed position.

3. The electronic apparatus according to claim 1, wherein the antenna housing groove extends to a corner of the one end surface, the antenna body rotates about the corner, and the protruding position includes a first protruding position where the antenna body rotates by 90 degrees from the housed position and a second protruding position where the antenna body further rotates by 90 degrees from the first protruding position.

4. The electronic apparatus according to claim 1, wherein the housing has a display panel fitted into a front side of the housing, and the electronic apparatus further comprises a second housing which has a keyboard mounted thereon and to which the housing is connected so as to be openable and closable.

* * * * *